(12) United States Patent
Suzuki

(10) Patent No.: US 12,112,219 B2
(45) Date of Patent: Oct. 8, 2024

(54) IMAGE-FORMING SYSTEM FOR IMAGE INSPECTION

(71) Applicant: CANON KABUSHIKI KAISHA, Tokyo (JP)

(72) Inventor: Takahiro Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/324,503

(22) Filed: May 26, 2023

(65) Prior Publication Data

US 2023/0401406 A1     Dec. 14, 2023

(30) Foreign Application Priority Data

Jun. 13, 2022  (JP) ................................ 2022-095222
Mar. 23, 2023  (JP) ................................ 2023-046969

(51) Int. Cl.
   *G06K 15/02*     (2006.01)
   *G03G 15/00*     (2006.01)
   *G06T 7/00*      (2017.01)

(52) U.S. Cl.
   CPC ........... *G06K 15/027* (2013.01); *G03G 15/55* (2013.01); *G06T 7/001* (2013.01); *G06T 2207/10008* (2013.01); *G06T 2207/30144* (2013.01)

(58) Field of Classification Search
   USPC ...................................................... 358/406
   See application file for complete search history.

(56) References Cited

U.S. PATENT DOCUMENTS

| | | | |
|---|---|---|---|
| 8,531,727 B2 | 9/2013 | Komiya | |
| 10,547,752 B2 | 1/2020 | Fukase | |
| 10,732,103 B2 | 8/2020 | Suzuki | |
| 10,837,903 B2 | 11/2020 | Ishii | |
| 2010/0079814 A1* | 4/2010 | Komiya | H04N 1/6033 |
| | | | 358/3.06 |
| 2017/0045839 A1* | 2/2017 | Takaishi | G03G 15/55 |
| 2019/0132454 A1 | 5/2019 | Fukase | |
| 2020/0401355 A1* | 12/2020 | Yamashita | G06F 3/1259 |
| 2022/0309298 A1* | 9/2022 | Takagi | G06T 7/0004 |
| 2023/0385582 A1* | 11/2023 | Sasaki | H04N 1/6033 |

FOREIGN PATENT DOCUMENTS

| | | |
|---|---|---|
| JP | 2010-085744 A | 4/2010 |
| JP | 2016-118674 A | 6/2016 |
| JP | 2019-087792 A | 6/2019 |

* cited by examiner

*Primary Examiner* — Jacky X Zheng
(74) *Attorney, Agent, or Firm* — Venable LLP

(57) ABSTRACT

An image-forming system includes an image-forming apparatus; a reading apparatus configured to read an image formed on a sheet to obtain read image data; and at least one processor configured to: control the image-forming apparatus to form a test chart on a first sheet, calibrate, using first read image data obtained by reading the test chart on the first sheet, second read image data that is obtained by reading an inspection target image formed by the image-forming apparatus on a second sheet based on RIP data, and inspect the inspection target image based on the calibrated second read image data and the RIP data. The test chart includes a patch arrangement with a plurality of patches, and a size of a periphery patch is smaller than a size of an interior patch.

9 Claims, 17 Drawing Sheets

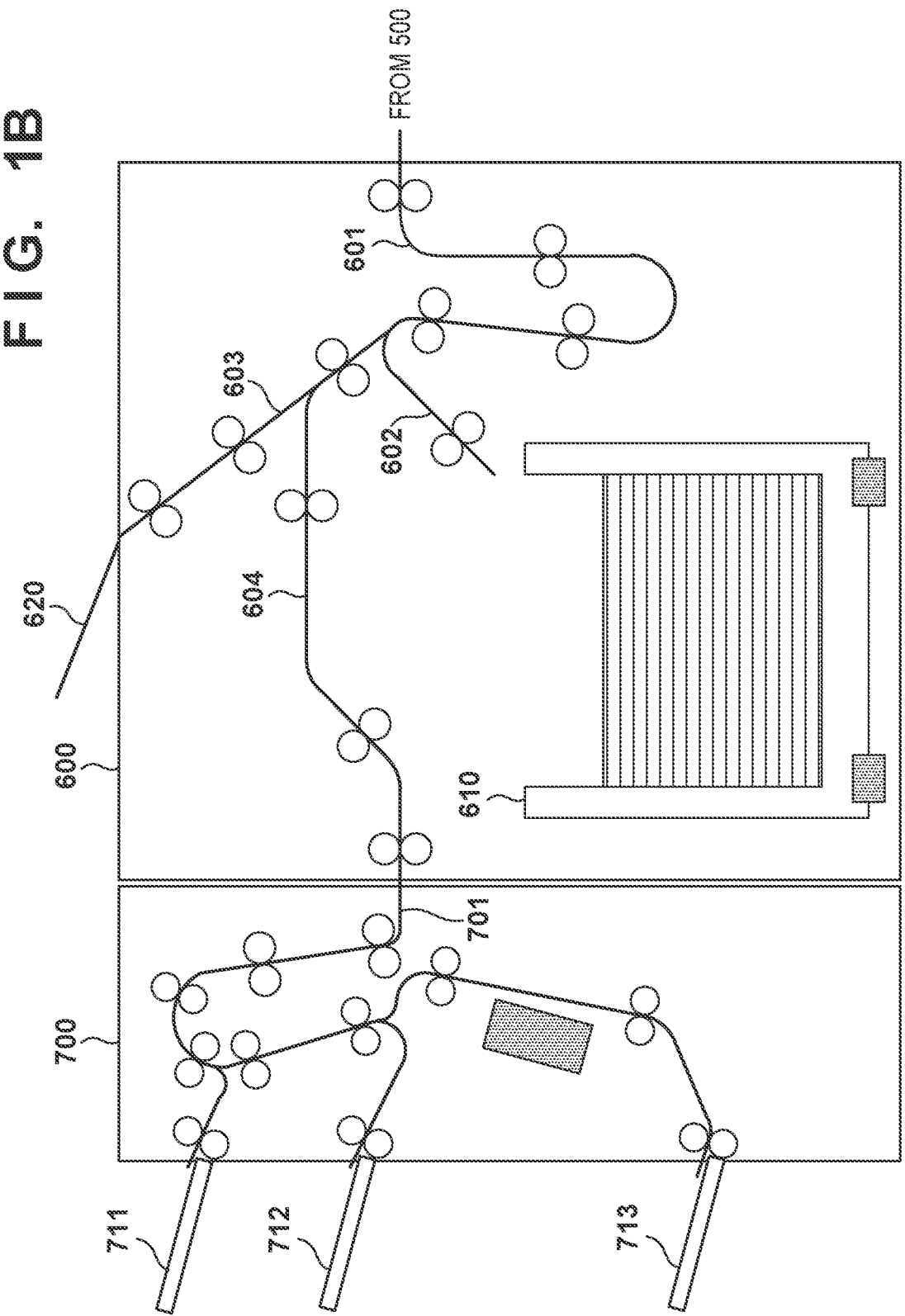

FIG. 7

| | m-11 | m-10 | m-9 | m-8 | m-7 | m-6 | m-5 | m-4 | m-3 | m-2 | m-1 | m | m+1 | ... | m+9 | m+10 | m+11 |
|---|---|---|---|---|---|---|---|---|---|---|---|---|---|---|---|---|---|
| n-7 | 0.000 | 0.000 | 0.000 | 0.000 | 0.000 | 0.000 | 0.000 | 0.000 | 0.000 | 0.000 | 0.000 | 0.000 | 0.000 | | 0.000 | 0.000 | 0.000 |
| n-6 | 0.000 | 0.000 | 0.000 | 0.001 | 0.002 | 0.002 | 0.002 | 0.003 | 0.003 | 0.003 | 0.004 | 0.100 | 0.004 | | 0.001 | 0.000 | 0.000 |
| n-5 | 0.000 | 0.004 | 0.008 | 0.012 | 0.015 | 0.019 | 0.023 | 0.027 | 0.031 | 0.035 | 0.038 | 0.200 | 0.038 | | 0.008 | 0.004 | 0.000 |
| n-4 | 0.000 | 0.019 | 0.038 | 0.058 | 0.077 | 0.096 | 0.115 | 0.134 | 0.154 | 0.173 | 0.192 | 0.400 | 0.192 | | 0.038 | 0.019 | 0.000 |
| n-3 | 0.000 | 0.048 | 0.096 | 0.144 | 0.192 | 0.240 | 0.288 | 0.336 | 0.384 | 0.432 | 0.480 | 0.600 | 0.480 | | 0.096 | 0.048 | 0.000 |
| n-2 | 0.000 | 0.080 | 0.160 | 0.240 | 0.320 | 0.400 | 0.480 | 0.560 | 0.640 | 0.720 | 0.800 | 0.800 | 0.800 | | 0.160 | 0.080 | 0.000 |
| n-1 | 0.000 | 0.100 | 0.200 | 0.300 | 0.400 | 0.500 | 0.600 | 0.700 | 0.800 | 0.900 | 1.000 | 1.000 | 1.000 | | 0.200 | 0.100 | 0.000 |
| n | 0.000 | 0.100 | 0.200 | 0.300 | 0.400 | 0.500 | 0.600 | 0.700 | 0.800 | 0.900 | 1.000 | X | 1.000 | | 0.200 | 0.100 | 0.000 |
| n+1 | 0.000 | 0.100 | 0.200 | 0.300 | 0.400 | 0.500 | 0.600 | 0.700 | 0.800 | 0.900 | 1.000 | 1.000 | 1.000 | | 0.200 | 0.100 | 0.000 |
| n+2 | 0.000 | 0.080 | 0.160 | 0.240 | 0.320 | 0.400 | 0.480 | 0.560 | 0.640 | 0.720 | 0.800 | 0.800 | 0.800 | | 0.160 | 0.080 | 0.000 |
| n+3 | 0.000 | 0.048 | 0.096 | 0.144 | 0.192 | 0.240 | 0.288 | 0.336 | 0.384 | 0.432 | 0.480 | 0.600 | 0.480 | | 0.096 | 0.048 | 0.000 |
| n+4 | 0.000 | 0.019 | 0.038 | 0.058 | 0.077 | 0.096 | 0.115 | 0.134 | 0.154 | 0.173 | 0.192 | 0.400 | 0.192 | | 0.038 | 0.019 | 0.000 |
| n+5 | 0.000 | 0.004 | 0.008 | 0.012 | 0.015 | 0.019 | 0.023 | 0.027 | 0.031 | 0.035 | 0.038 | 0.200 | 0.038 | | 0.008 | 0.004 | 0.000 |
| n+6 | 0.000 | 0.000 | 0.001 | 0.001 | 0.002 | 0.002 | 0.002 | 0.003 | 0.003 | 0.003 | 0.004 | 0.100 | 0.004 | | 0.001 | 0.000 | 0.000 |
| n+7 | 0.000 | 0.000 | 0.000 | 0.000 | 0.000 | 0.000 | 0.000 | 0.000 | 0.000 | 0.000 | 0.000 | 0.000 | 0.000 | | 0.000 | 0.000 | 0.000 |

FIG. 12

| No. | RIP SIGNAL VALUE | | | CALIBRATED VALUE | | |
|---|---|---|---|---|---|---|
| | R | G | B | R | G | B |
| 1 | 255 | 255 | 255 | 250 | 250 | 250 |
| 2 | 255 | 255 | 254 | 250 | 250 | 250 |
| 3 | 255 | 255 | 253 | 250 | 250 | 250 |
| : | : | : | : | : | : | : |
| 8388607 | 128 | 128 | 129 | 126 | 126 | 126 |
| 8388608 | 128 | 128 | 128 | 126 | 126 | 126 |
| 8388609 | 128 | 128 | 127 | 126 | 126 | 125 |
| : | : | : | : | : | : | : |
| 16777214 | 0 | 0 | 2 | 8 | 8 | 8 |
| 16777215 | 0 | 0 | 1 | 8 | 8 | 8 |
| 16777216 | 0 | 0 | 0 | 8 | 8 | 8 |

IMAGE-FORMING SYSTEM FOR IMAGE INSPECTION

BACKGROUND OF THE INVENTION

Field of the Invention

The present disclosure relates to an image-forming system.

Description of the Related Art

Thus far, an inspection apparatus has been known which inspects a printed image formed on a sheet by an image-forming apparatus by comparing input image data with read image data of an image optically read from the sheet. For example, the tint of the printed image can be inspected by comparing the images of the three color components of raster format input image data (e.g., red (R), green (G), and blue (B)) with images of the corresponding color components in the read image data.

In such an inspection, the input image data is digital data representing an ideal image, whereas the read image data contains error caused by a variety of factors related to image formation and reading. Japanese Patent Laid-Open No. 2019-087792 discloses a technique for calibrating image data using a pattern including a predefined patch arrangement in order to prevent a drop in inspection accuracy caused by, for example, sheet misalignment and magnification error. With the technique disclosed in Japanese Patent Laid-Open No. 2019-087792, parameters for compensating for misalignment and magnification variation are calculated based on read image data generated by using a scanner to read a pattern image formed on a sheet. The input image data is then corrected using the calculated parameters.

The defect of the image to be inspected for includes not only position and magnification error, but also the aforementioned tint error. Tint error typically occurs when four colors of developing agents (e.g., toner or ink), namely yellow (Y), magenta (M), cyan (C), and black (K), are used in image formation. In addition, error components caused by what is known as "flare" affect tint inspection. "Flare" is a phenomenon in which light reflected from neighboring pixel positions on the sheet enters respective reading pixels of the scanner. Generally, the brighter the printed image or the base color is in neighboring pixel positions, the greater the amount of flare becomes. Japanese Patent Laid-Open No. 2010-085744 proposes a technique in which a background pattern is arranged around a patch arrangement in order to reduce reading errors caused by flare. Japanese Patent Laid-Open No. 2016-118674 proposes a technique in which instead of arranging a background pattern, a patch located on the edge of a patch arrangement is expanded outward.

SUMMARY OF THE INVENTION

However, none of the techniques proposed in the past has achieved an optimal arrangement of a plurality of patches under the constraints of limited sheet sizes. To improve the performance of calibration using pattern images for calibration, it is desirable for the pattern to have as many color patches as possible. However, if each patch is too small, the effect of flare from the neighboring pixels will be predominant.

In view of the above-described circumstances, the present disclosure aims to provide a technique for improving calibration performance while effectively reducing the effect of flare, using a pattern for calibration having an improved patch arrangement.

According to one aspect, there is provided an image-forming system including: an image-forming apparatus configured to form an image on a sheet; a reading apparatus configured to read, via a transparent member, an image formed on a sheet conveyed from the image-forming apparatus to obtain read image data; and at least one processor configured to: control the image-forming apparatus to form a test chart that is a predetermined image on a first sheet, calibrate, using first read image data obtained by the reading apparatus reading the test chart on the first sheet, second read image data that is obtained by the reading apparatus reading an inspection target image formed by the image-forming apparatus on a second sheet based on RIP data, and inspect the inspection target image based on the calibrated second read image data and the RIP data, wherein the test chart includes a patch arrangement with a plurality of patches, and a size of a periphery patch located at a periphery of the patch arrangement is smaller than a size of an interior patch located further inside than the periphery patch.

Further features of the present invention will become apparent from the following description of exemplary embodiments (with reference to the attached drawings).

BRIEF DESCRIPTION OF THE DRAWINGS

FIG. 1B is a schematic diagram illustrating a second part of the configuration of an inspection system according to an embodiment.

FIG. 7 is a descriptive diagram illustrating an example of a flare range.

FIG. 12 is a descriptive diagram illustrating an example of the configuration of a lookup table for calibration.

DESCRIPTION OF THE EMBODIMENTS

Figure 1A:
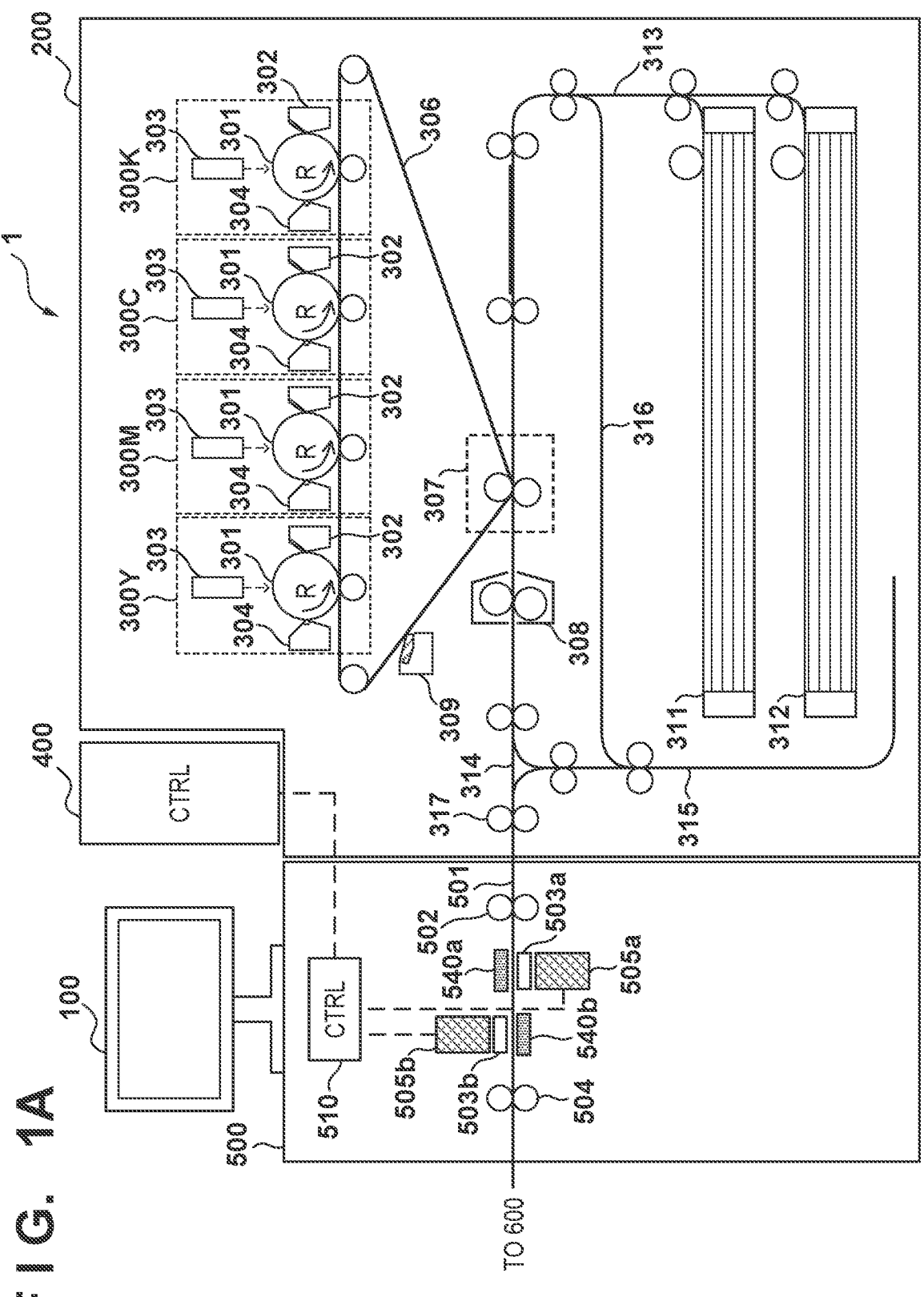
FIG. 1A is a schematic diagram illustrating a first part of the configuration of an inspection system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. System Overview

FIGS. 1A and 1B are schematic diagrams illustrating the configuration of an inspection system 1 according to an embodiment. As illustrated in FIG. 1A, the inspection system 1 includes an operation unit 100, an image-forming apparatus 200, a control apparatus 400, and an inspection apparatus 500. Referring to FIG. 1B, the inspection system 1 further includes a stacker 600 and a finisher 700.

(1) Operation Unit

The operation unit 100 is an apparatus that provides a user with a user interface constituted by an input interface and an output interface. The input interface may include at least one of, for example, input keys, a touch panel, buttons, and switches. The output interface may include at least one of, for example, a display, a speaker, and a lamp. The operation unit 100 accepts user inputs made through the input interface and transmits instruction signals or data corresponding to the accepted user inputs to the control apparatus 400. The operation unit 100 also outputs information from the output interface (e.g., causes a display to display images or causes a speaker to output audio) based on instructions received from the control apparatus 400.

(2) Image-Forming Apparatus

The image-forming apparatus 200 is an apparatus that forms an image on a sheet (also called a "printer"). In the present embodiment, the image-forming apparatus 200 is a color printer capable of forming color images. In another embodiment, however, the image-forming apparatus 200 may be a black-and-white printer. The image-forming apparatus 200 includes image-forming units 300Y, 300M, 300C, and 300K; an intermediate transfer member 306; a transfer unit 307; a fixing unit 308; a cleaner 309; paper cassettes 311 and 312; and a feeding mechanism.

The image-forming unit 300Y forms a yellow (Y) toner image on the intermediate transfer member 306. The image-forming unit 300M forms a magenta (M) toner image on the intermediate transfer member 306. The image-forming unit 300C forms a cyan (C) toner image on the intermediate transfer member 306. The image-forming unit 300K forms a black (K) toner image on the intermediate transfer member 306. The image-forming units 300Y, 300M, 300C, and 300K have the same configurations as each other, and thus the configuration of the image-forming unit 300Y will be described here as an example. The image-forming unit 300Y includes a photosensitive drum 301, a charger 302, an exposure unit 303, and a developer 304. The photosensitive drum 301 is a drum-shaped photosensitive member having a photosensitive layer on the surface thereof. The photosensitive drum 301 rotates about a drum shaft in the direction of an arrow R in the drawings. The charger 302 uniformly charges the surface of the rotating photosensitive drum 301. The exposure unit 303 irradiates the photosensitive drum 301 with a laser beam according to image data (here, expressing a yellow image) input from the control apparatus 400. The laser beam output from the exposure unit 303 scans the surface of the charged photosensitive drum 301 in a drum axis direction and forms an electrostatic latent image on the surface of the photosensitive drum 301. The developer 304 develops the electrostatic latent image on the photosensitive drum 301 by supplying (yellow, in this case) toner to the surface of the photosensitive drum 301. A toner image is formed on the surface of the photosensitive drum 301 as a result. The yellow toner image formed on the surface of the photosensitive drum 301 in the image-forming unit 300Y is transferred to the intermediate transfer member 306. Furthermore, the magenta, cyan, and black toner images formed on the surface of the respective photosensitive drums 301 in the image-forming units 300M, 300C, and 300K are superimposed onto the yellow toner image and transferred to the intermediate transfer member 306 in order. A full-color toner image is formed on the intermediate transfer member 306 as a result. The intermediate transfer member 306 is an endless belt member which rotates in what is the clockwise direction in the drawings. The intermediate transfer member 306 transports the full-color toner image to the position of the transfer unit 307 (a transfer position).

The paper cassettes 311 and 312 hold bundles of sheets. A sheet is picked up from the paper cassette 311 or 312 by the feeding mechanism and transported along a transport path 313. The sheet is transported to the transfer position under the control of the control apparatus 400, so as to coincide with the timing at which the toner image on the intermediate transfer member 306 reaches the transfer position. It should be noted that a transport path (transport direction) can also be referred to as a conveyance path (conveyance direction).

The transfer unit 307 transfers the toner image carried by the intermediate transfer member 306 to the sheet at the transfer position. The fixing unit 308 includes a heater and a pressure roller. The fixing unit 308 heats the toner image transferred onto the sheet using the heater, and pressurizes the toner image using the pressure roller. This melts the toner on the sheet and fixes the toner image onto the sheet. The cleaner 309 is disposed downstream from the transfer position on the path of the intermediate transfer member 306, and removes toner remaining on the intermediate transfer member 306 after the toner image has been transferred.

The transport path 313 branches into transport paths 314 and 315 downstream from the fixing unit 308. A sheet that has passed through the fixing unit 308 is first transported from the transport path 313 to the transport path 315. When a following end of the sheet enters the transport path 315, the transport direction reverses and the sheet is discharged from discharge rollers 317 to the inspection apparatus 500. As a result of this transport, the sheet is discharged with the surface on which the image is formed facing down (called "face-down"). When performing double-sided printing, the sheet which had entered the transport path 315 is transported to a transport path 316, and then returns from the transport path 316 back to the transport path 313, passing through the transfer position again having been flipped front to back. At the transfer position, a toner image is formed on the rear surface of the sheet by the transfer unit 307, and the toner image is fixed onto the sheet in the fixing unit 308. The sheet having images formed on both sides is discharged from the discharge rollers 317 to the inspection apparatus 500.

(3) Control Apparatus

The control apparatus 400 controls the operations of the image-forming apparatus 200, the inspection apparatus 500, the stacker 600, and the finisher 700 based on instruction signals received from the operation unit 100 or an external network. The control apparatus 400 may be part of the image-forming apparatus 200 or the inspection apparatus 500. For example, when the user has made an instruction to execute a print job, the control apparatus 400 controls the image-forming apparatus 200 to form an image based on designated input image data onto the sheet. The configuration of the control apparatus 400 will be described in detail later.

(4) Inspection Apparatus

The inspection apparatus 500 includes a transport path 501, transport rollers 502, a flowing reading glass 503a, a flowing reading glass 503b, transport rollers 504, a first reading unit 505a, a second reading unit 505b, and an inspection control unit 510. The transport rollers 502 accept the sheet discharged from the image-forming apparatus 200, and transport the sheet along the transport path 501. The first reading unit 505a generates read image data by optically reading the image formed on the lower surface of the sheet passing above the flowing reading glass 503a, and outputs the generated read image data to the inspection control unit 510. The first reading unit 505a irradiates the sheet with white light from at least one white light emitting diode (LED), for example. The first reading unit 505a can read the image on the sheet by using an array of pixels in a complementary metal oxide semiconductor (CMOS) sensor, for example, to detect reflected light reflected by the lower surface of the sheet. Typically, the first reading unit 505a receives the reflected light from the sheet having been divided into three color components by an RGB color filter. Accordingly, the read image data output from the first reading unit 505a is raster format data expressing a three-dimensional vector having three RGB color component values, for each pixel. A backing member (called a "backing" hereinafter) 540a is disposed on the opposite side of the flowing reading glass 503a with the transport path 501 therebetween, at a reading position where the first reading unit 505a reads the image of the sheet. As will be described later, the first reading unit 505a can also receive reflected light from the backing 540a around the sheet. The second reading unit 505b generates read image data by optically reading the image formed on the upper surface of the sheet passing below the flowing reading glass 503b, and outputs the generated read image data to the inspection control unit 510. The second reading unit 505b may have a configuration similar to that of the first reading unit 505a, and thus the read image data output from the second reading unit 505b is also raster format data expressing a three-dimensional vector having three RGB color component values, for each pixel. A backing 540b is disposed on the opposite side of the flowing reading glass 503b with the transport path 501 therebetween, at a reading position where the second reading unit 505b reads the image of the sheet. The second reading unit 505b can also receive reflected light from the backing 540b around the sheet. The transport rollers 504 discharge the sheet which has passed the flowing reading glasses 503a and 503b to the stacker 600. The inspection control unit 510 controls such operations of the inspection apparatus 500 in cooperation with the control apparatus 400. The configuration of the inspection control unit 510 will be described in detail later.

(5) Stacker

Referring to FIG. 1B, the stacker 600 includes transport paths 601, 602, 603, and 604, a high-capacity tray 610, and a purge tray 620. The stacker 600 accepts sheets passed from the inspection apparatus 500 into the transport path 601. The transport path 601 branches to the transport path 602, which leads to the high-capacity tray 610; the transport path 603, which leads to the purge tray 620; and to the transport path 604, which leads to the finisher 700. For example, a sheet on which an image determined to be defective by the inspection apparatus 500 is formed can be discharged to the purge tray 620 through the transport path 603 under the control of the control apparatus 400. A sheet which requires post-processing by the finisher 700 can be discharged to the finisher 700, and other sheets can be discharged to the high-capacity tray 610.

(6) Finisher

The finisher 700 is a post-processing apparatus including a transport path 701 and discharge trays 711, 712, and 713. The finisher 700 accepts a sheet passed from the stacker 600 into the transport path 701, and discharges the sheet to one of the discharge trays 711, 712, and 713 under the control of the control apparatus 400. Although not illustrated here, the finisher 700 may include mechanisms for performing various types of post-processing, such as stapling processing, binding processing, or cutting processing for multiple sheets.

2. Example of Configuration of Control Apparatus

Figure 2:
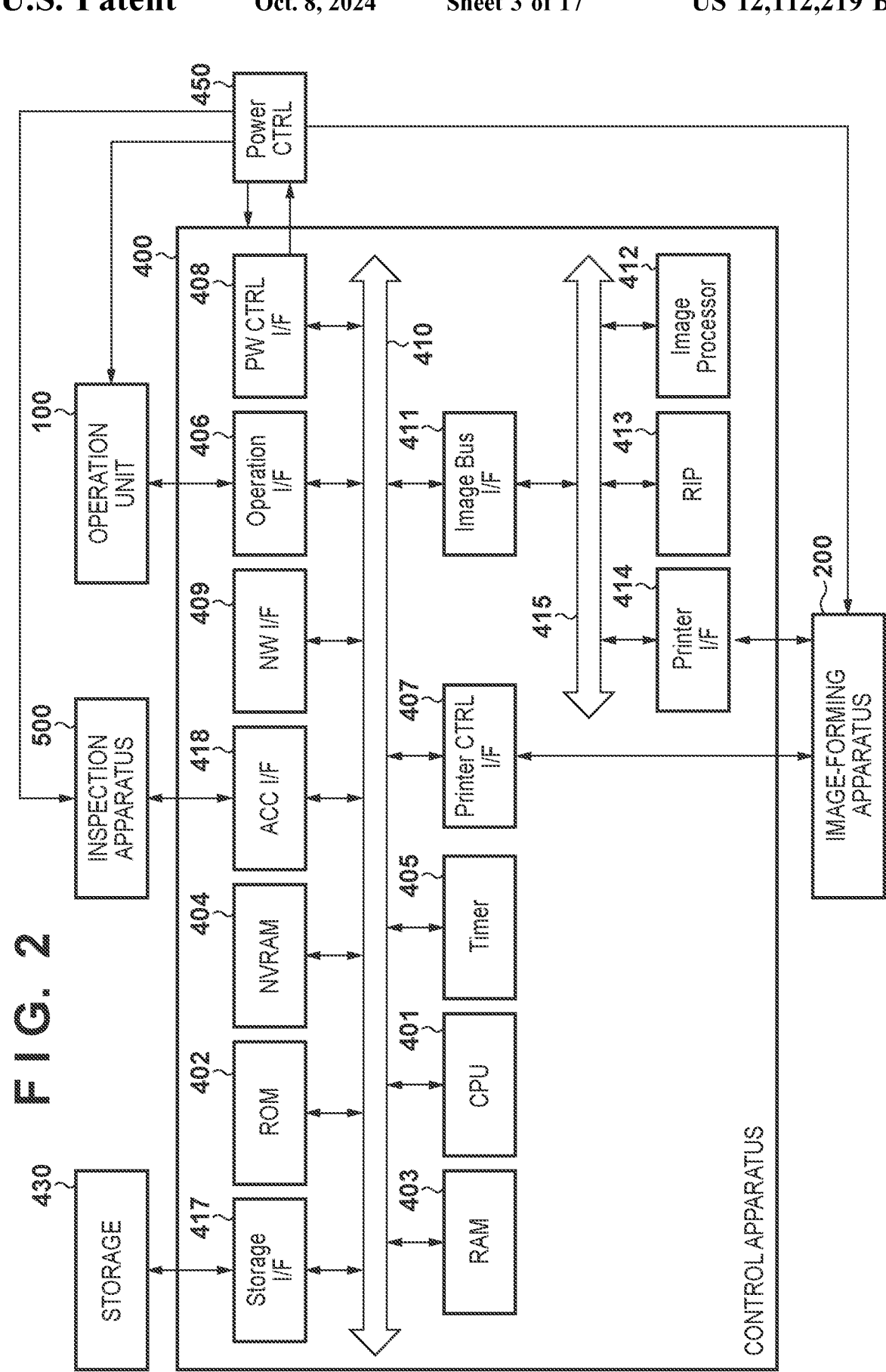
FIG. 2 is a block diagram illustrating an example of the configuration of a control apparatus according to an embodiment.

FIG. 2 is a block diagram illustrating an example of the configuration of the control apparatus 400. Although the above-described operation unit 100, image-forming apparatus 200, inspection apparatus 500, stacker 600, and finisher 700 are connected to the control apparatus 400, FIG. 2 does not illustrate the connection relationships of the control apparatus 400 with the stacker 600 and the finisher 700. Storage 430 and a power control unit 450 are further connected to the control apparatus 400.

The control apparatus 400 includes a CPU 401, a ROM 402, a RAM 403, an NVRAM 404, and a timer 405. The central processing unit (CPU) 401 is a processor that controls the overall operation of the inspection system 1 by executing computer programs including software instructions. The read only memory (ROM) 402 is a non-volatile memory that stores at least one computer program executed by the CPU 401. The random access memory (RAM) 403 is a volatile memory that provides a temporary storage area for processing by the CPU 401. The RAM 403 may be used as an image memory for temporarily storing image data. The non-volatile RAM (NVRAM) 404 is a small-scale non-volatile memory that stores the values of various parameters needed to control the operation of the inspection system 1. The timer 405 is used to obtain the current time and monitor the passage of a set length of time. The CPU 401, the ROM 402, the RAM 403, the NVRAM 404, and the timer 405 are connected to each other by a system bus 410.

The control apparatus 400 further includes interfaces (I/F) such as an operation I/F 406, a printer control I/F 407, a power control I/F 408, a network I/F 409, an image bus I/F 411, a storage I/F 417, and an ACC I/F 418. These interfaces are also connected to each other by the system bus 410. The operation I/F 406 connects the control apparatus 400 to the operation unit 100. The printer control I/F 407 is an interface that mediates control communication between the control apparatus 400 and the image-forming apparatus 200. The power control I/F 408 connects the control apparatus 400 to the power control unit 450. The power control unit 450 causes power to be supplied as needed to each apparatus constituting the inspection system 1 from a power source (not shown) according to instructions input from the CPU 401 via the power control I/F 408. The network I/F 409 connects the control apparatus 400 to an external network (not shown). The control apparatus 400 can communicate with external apparatuses (e.g., a host computer) via the network I/F 409. The network I/F 409 may be, for example, a wired local area network (LAN) interface or a wireless LAN interface. For example, input image data required to execute a print job (e.g., page description language (PDL) data) can be received from an external apparatus via the network I/F 409. The network I/F 409 may include a memory that stores parameters for communication control, such as address information of the control apparatus 400 (e.g., a MAC address and an IP address). The image bus I/F 411 is a bridge that mediates a connection between the system bus 410 and an image bus 415. The storage I/F 417 connects the control apparatus 400 to the storage 430. The storage 430 is a high-capacity storage device. The storage 430 may be, for example, a hard disk drive (HDD) or a solid state drive (SSD). The ACC I/F 418 connects the control apparatus 400 to the inspection apparatus 500.

The control apparatus 400 further includes an image processing unit 412, a RIP 413, and a printer I/F 414. The image bus I/F 411, the image processing unit 412, the RIP 413, and the printer I/F 414 are connected to each other by the image bus 415. The image processing unit 412 performs image processing on the image data, such as compressing or decompressing image data according to an image compression method, rotating images to correct skew, correcting pixel values, converting color spaces, or converting resolutions. In the present embodiment, the image processing unit 412 also has a function for calibrating the input image data using calibration parameters, which will be described in detail later. The image processing unit 412 is therefore also called a "calibration unit 412". The raster image processing (RIP) 413 expands PDL data into image data in raster format (also referred to as the "bitmap format") (RIP data). The printer I/F 414 is an interface that mediates the communication of image data between the control apparatus 400 and the image-forming apparatus 200. The input image data of the print job is rasterized by the RIP 413 to be converted into RIP data, and after being further processed by the image processing unit 412 (e.g., color space conversion from RGB to YMCK), is output to the image-forming apparatus 200 via the printer I/F 414.

3. Example of Configuration of Inspection Control Unit

Figure 3:
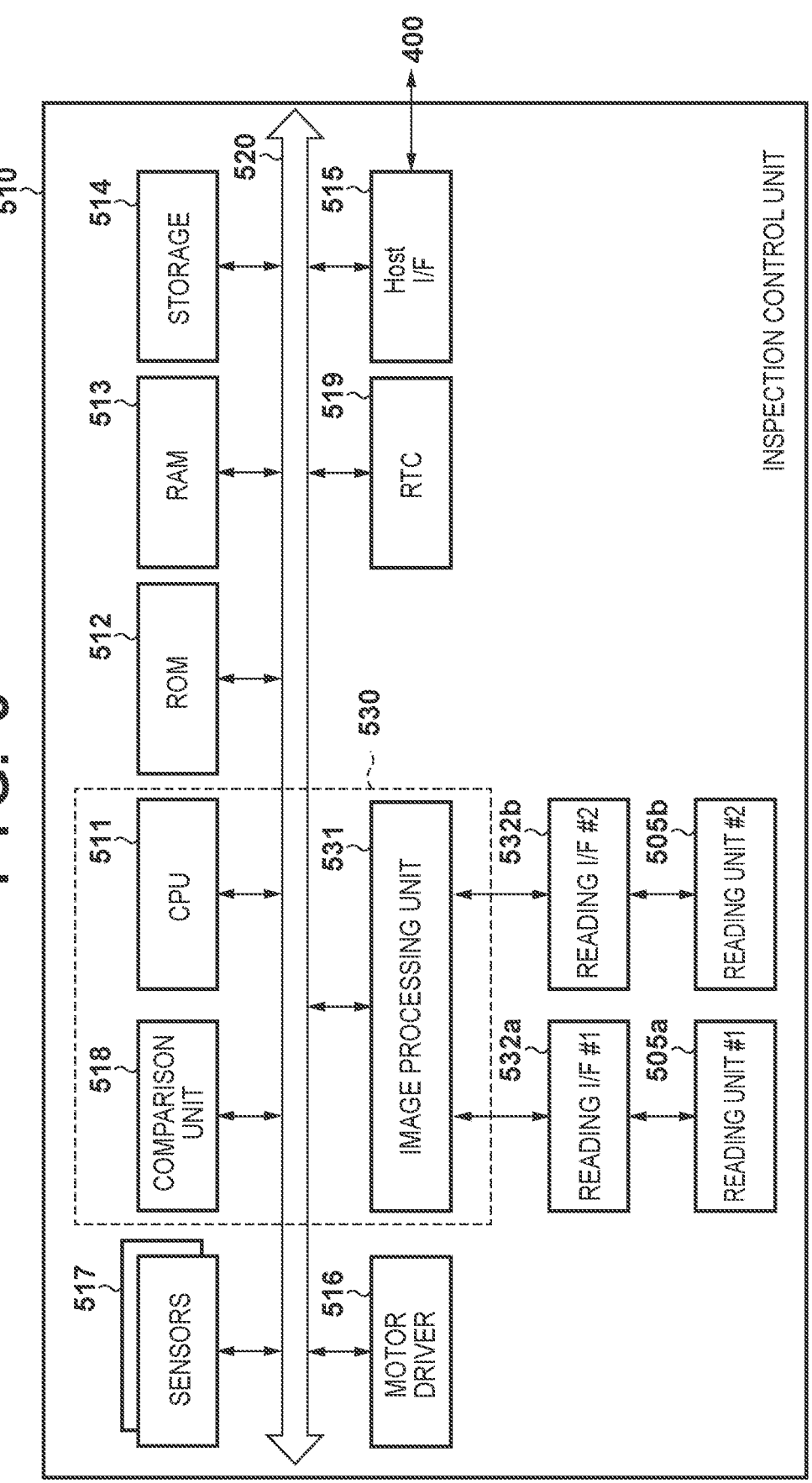
FIG. 3 is a block diagram illustrating an example of the configuration of an inspection control unit according to an embodiment.

FIG. 3 is a block diagram illustrating an example of the configuration of the inspection control unit 510. The inspection control unit 510 includes a CPU 511, a ROM 512, a RAM 513, storage 514, a host I/F 515, a motor driver 516, sensors 517, a comparison unit 518, an RTC 519, and an image processing unit 531.

The CPU 511 is a processor that controls the operation of the inspection apparatus 500 by executing computer programs including software instructions. The ROM 512 is a non-volatile memory that stores at least one computer program executed by the CPU 511. The RAM 513 is a volatile memory that provides a temporary storage area for processing by the CPU 511. The RAM 513 may be used as an image memory for temporarily storing image data. The storage 514 may be, for example, a storage device such as an HDD or an SSD, and can store various data. The host OF 515 connects the inspection control unit 510 to the ACC OF 418 of the control apparatus 400. For example, when the image-forming apparatus 200 has formed an image requiring inspection on a sheet, the host OF 515 receives raster format input image data (RIP data) corresponding to that image from the control apparatus 400. The received input image data is stored in the storage 514, for example.

Under the control of the CPU 511, the motor driver 516 drives a motor (not shown) for rotating the plurality of rollers in the inspection apparatus 500 such that the sheet is transported along the transport path within the inspection apparatus 500 at the appropriate timing. The sensors 517 are a group of sensors including sensors for detecting the position of the sheet passing through the transport path in the inspection apparatus 500. The sensors 517 output respective detection results to the CPU 511. The comparison unit 518 compares the input image data with read image data for inspection (described later) to inspect a target image formed on the sheet. Inspection based on the image comparison performed in the comparison unit 518 will be described further later. The real time clock (RTC) 519 is a clock that measures real time with high precision.

Synchronization between the sheet transport and image reading in the inspection apparatus 500 can be maintained based on measurements by the RTC 519. The CPU 511, the ROM 512, the RAM 513, the storage 514, the host OF 515, the motor driver 516, the sensors 517, the comparison unit 518, the RTC 519, and the image processing unit 531 are connected to each other by a system bus 520.

The inspection control unit 510 further includes a first reading OF 532a and a second reading I/F 532b. The first reading I/F 532a is an interface that connects the inspection control unit 510 to the first reading unit 505a illustrated in FIG. 1A. The first reading I/F 532a obtains the read image data of a first surface (the lower surface, in FIG. 1A) of the sheet from the first reading unit 505a, and outputs the obtained read image data to the image processing unit 531. The second reading I/F 532b is an interface that connects the inspection control unit 510 to the second reading unit 505b illustrated in FIG. 1A. The second reading I/F 532b obtains the read image data of a second surface (the upper surface, in FIG. 1A) of the sheet from the second reading unit 505b, and outputs the obtained read image data to the image processing unit 531. The image processing unit 531 performs image processing such as, for example, magnification and gamma correction on the read image data obtained through the first reading I/F 532a and the second reading I/F 532b. The image processing unit 531 then outputs the processed read image data to the RAM 513 for comparison with the input image data by the comparison unit 518, for example. Note that in the following descriptions, the CPU 511, the comparison unit 518, and the image processing unit 531 may be collectively called an "inspection unit 530".

4. Details of Processing 4-1. Settings Related to Inspection

Figure 4:
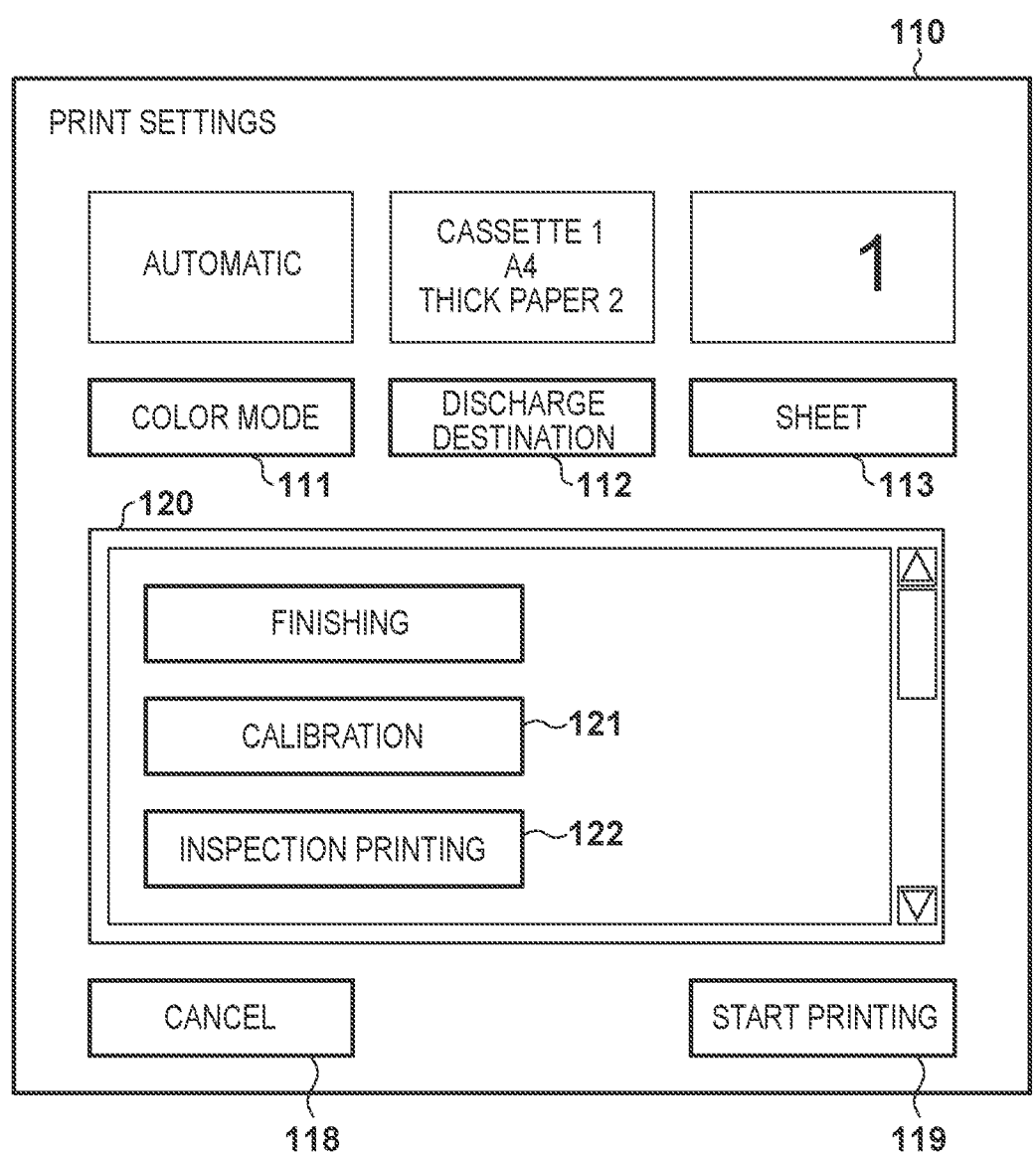
FIG. 4 is a descriptive diagram illustrating an example of a print settings screen according to an embodiment.

FIG. 4 is a descriptive diagram illustrating an example of a print settings screen according to the embodiment. A print settings screen 110 illustrated in FIG. 4 can be displayed in the display of the operation unit 100 or a host computer when, for example, the user instructs the inspection system 1 to execute a print job. The print settings screen 110 includes a first setting button 111, a second setting button 112, a third setting button 113, a cancel button 118, a print start button 119, and an advanced menu section 120.

The first setting button 111 is a button for setting a color mode (color or black-and-white). The second setting button 112 is a button for setting to which discharge tray sheets are to be discharged. The third setting button 113 is a button for setting the type of sheet to be used for printing. It may be made possible to display information such as the size and basis weight of the sheets held in each cassette, as well as to change the cassette to be used, in response to the third setting button 113 being operated. The cancel button 118 is a button for canceling the execution of the print job and closing the print settings screen 110. The print start button 119 is a button for instructing a print job which does not involve inspection to be executed.

A user interface for calling detailed setting items or advanced functions is provided in the advanced menu section 120. In the example in FIG. 4, the advanced menu section 120 includes a calibration button 121 and an inspection print button 122. The calibration button 121 is a button for executing a first operation mode in which calibration is performed, that is, for instructing the execution of a calibration function (described later) to be started. The inspection print button 122 is a button for executing a second operation mode in which inspection printing is performed, or for calling a user interface related to inspection printing (printing for inspection). When the user operates the inspection print button 122, the print settings screen 110 transitions to an inspection print screen 140, illustrated in FIG. 5.

Figure 5:
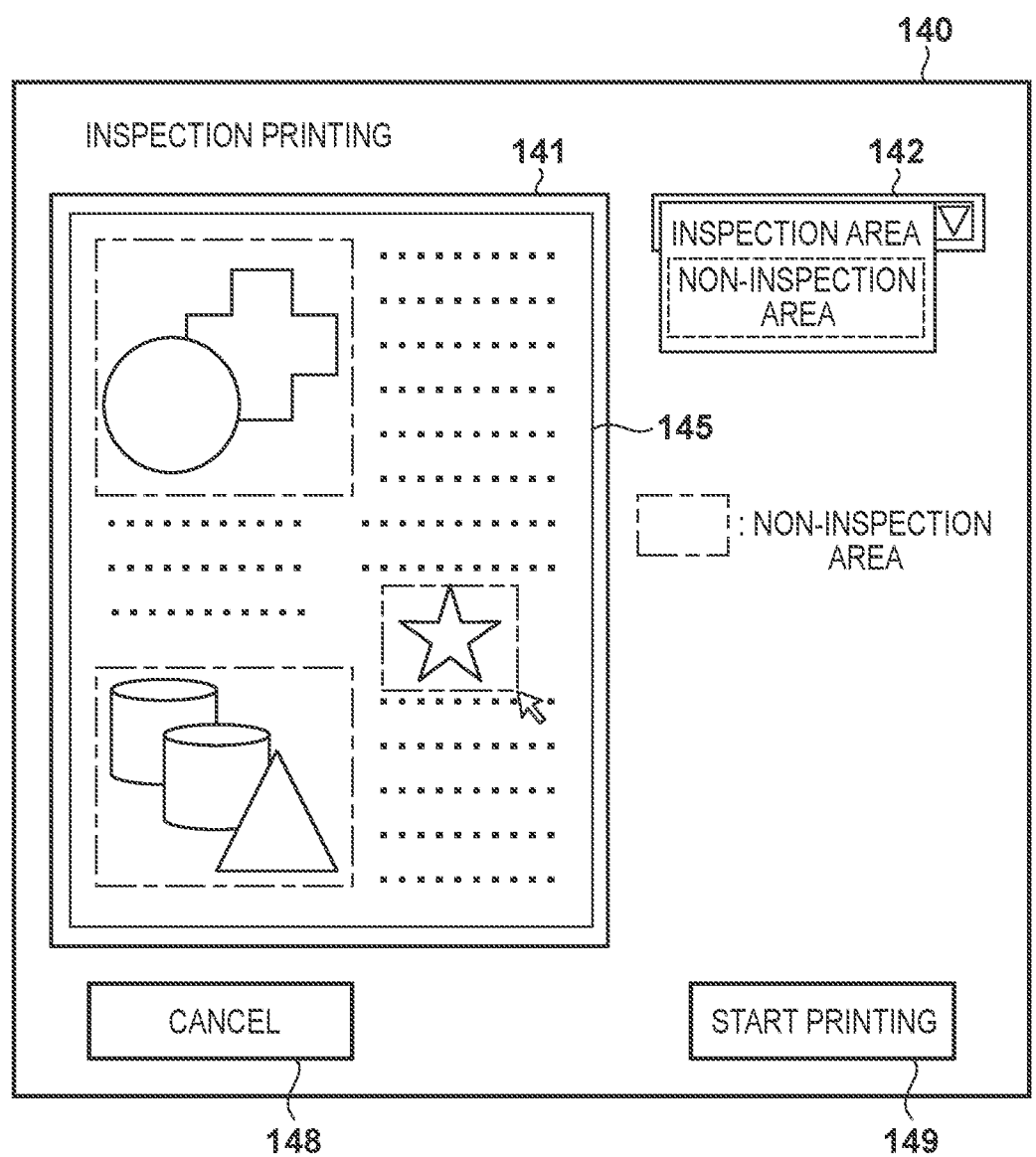
FIG. 5 is a descriptive diagram illustrating an example of an inspection print screen according to an embodiment.

FIG. 5 is a descriptive diagram illustrating an example of the inspection print screen according to the embodiment. Referring to FIG. 5, the inspection print screen 140 includes an area designation section 141, a pull-down menu 142, a cancel button 148, and a print start button 149. A preview of a target image to be inspected (an input image for the print job) is displayed in the area designation section 141. The pull-down menu 142 has two options, namely "inspection area" and "non-inspection area", and accepts the selection of one of these options. For example, when the user selects "inspection area" in the pull-down menu 142 and designates a target area in the area designation section 141 (using, for example, a dragging operation), the designated area is registered as the inspection area. In this case, the part of the target image outside the inspection area is excluded from the inspection of the printed image. On the other hand, when the user selects "non-inspection area" in the pull-down menu 142 and designates a target area in the area designation section 141, the designated area is registered as a non-inspection area. In this case, the part of the target image outside the non-inspection area is subject to inspection of the printed image. Although not illustrated in FIG. 5, the inspection print screen 140 may include additional buttons for moving the preview in the area designation section 141 among a plurality of pages. The cancel button 148 is a button for canceling the inspection printing settings and returning to the print settings screen 110. The print start button 149 is a button for instructing an inspection printing job to be executed.

4-2. Flare Model

When a printed image is read from a sheet using a scanner such as the first reading unit 505a and the second reading unit 505b of the inspection apparatus 500, the read image data often contains error caused by the above-described flare. Flare affects both calibration and inspections performed using the scanner. A flare model for quantitatively examining the effect of such flare will be described here.

Figure 6A:
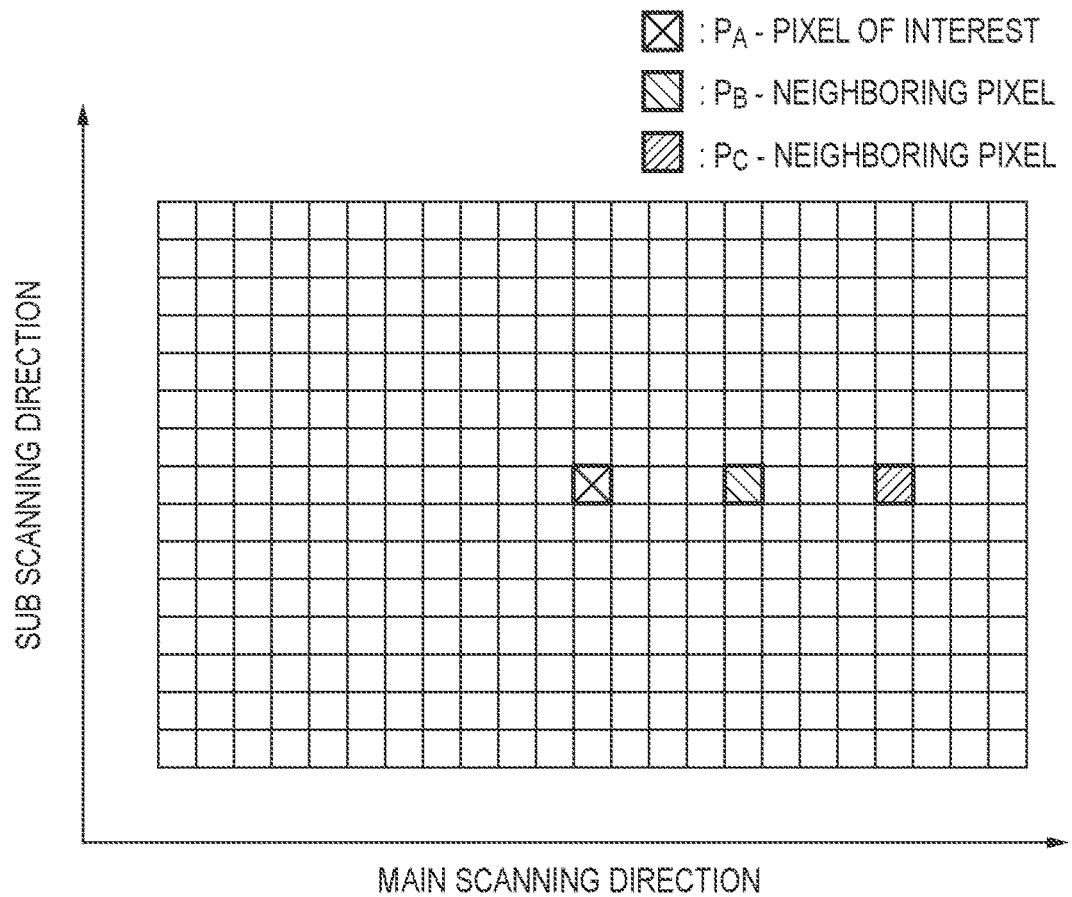
FIG. 6A is a descriptive diagram illustrating an example of positional relationships between a pixel of interest and neighboring pixels.

FIG. 6A is a descriptive diagram illustrating an example of positional relationships between a pixel of interest and neighboring pixels. In FIG. 6A, the horizontal axis represents a main scanning direction, the vertical axis represents a sub scanning direction, and the grid represents a given group of the pixels in the read image data. Here, the "main scanning direction" is the direction orthogonal to the transport direction of the sheets, and is the direction parallel to a one-dimensional pixel array of the scanner. On the other hand, the "sub scanning direction" is the direction parallel to the transport direction of the sheets. A pixel of interest $P_A$ is assumed to be located in the center of the grid. Many neighboring pixels are present around the pixel of interest $P_A$, and neighboring pixels $P_B$ and $P_C$ are examples thereof. A distance between the pixel of interest $P_A$ and the neighboring pixel $P_B$ is shorter than a distance between the pixel of interest $P_A$ and the neighboring pixel $P_C$.

Figure 6B:
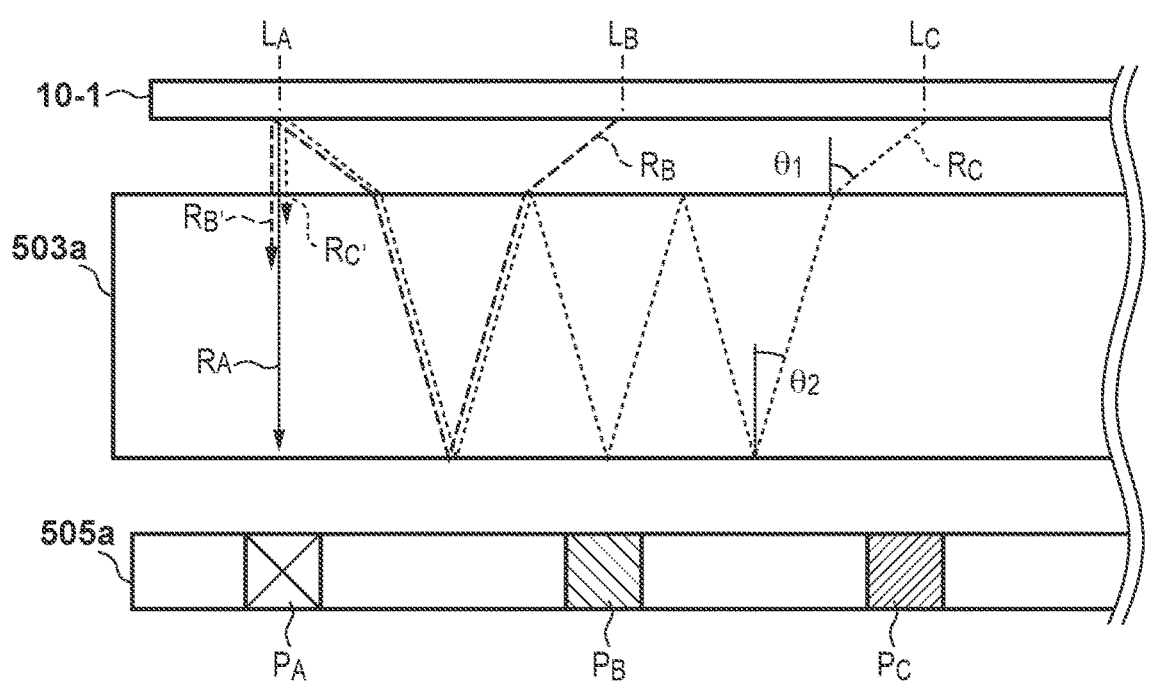
FIG. 6B is a descriptive diagram illustrating flare from neighboring pixels with respect to a pixel of interest when a sheet is blank.

FIG. 6B schematically illustrates the state of flare from neighboring pixels on the pixel of interest $P_A$ when the inspection apparatus 500 has accepted a white sheet. A white sheet 10-1 is partially indicated in the upper section of FIG. 6B, and positions $L_A$, $L_B$, and $L_C$ on the sheet 10-1 correspond to the positions of the pixel of interest $P_A$, the neighboring pixel $P_B$, and the neighboring pixel $P_C$, respectively. However, the relative positional relationships among these pixels are the issue here, and thus the absolute positions of the pixels have no special significance.

The flowing reading glass 503a is partially indicated in the middle section of FIG. 6B, and the pixel array of the first reading unit 505a is partially indicated in the lower section. When the first reading unit 505a irradiates the sheet 10-1 with light, the light is reflected by the lower surface of the sheet 10-1. Reflected light $R_A$ is the main component of light reflected at the position $L_A$, and is incident on the pixel of interest $P_A$. Reflected light $R_B$ is a secondary component of the light reflected at the position $L_B$, which is attenuated by being refracted and reflected at a boundary surface of the flowing reading glass 503a, and is incident on the pixel of interest $P_A$ as reflected light $R_B'$. Reflected light $R_C$ is a secondary component of the light reflected at the position $L_C$, which is attenuated by being refracted and reflected at the boundary surface of the flowing reading glass 503a, and is incident on the pixel of interest $P_A$ as reflected light $R_C'$. Refraction conditions of the flowing reading glass 503a can be expressed by the following Formula (1):

$$N_1 \times \sin\theta_1 = N_2 \times \sin\theta_2 \qquad (1)$$

Here, $N_1$ represents the refractive index of air, $N_2$ represents the refractive index of the flowing reading glass, $\theta_1$ represents the incident angle from the air to the glass, and $\theta_2$ represents the incident angle from the glass to the air. The greater $\theta_1$ is, the greater the component reflected at the boundary surface of the glass becomes. Although the drawings illustrate only one optical path from each of the positions $L_B$ and $L_C$ to the pixel of interest $P_A$, reflection can actually occur various numbers of times at the glass and the sheet, and thus there can be a plurality of optical paths from each position to the pixel of interest. The intensity of the reflected light $R_B'$ is lower than the intensity of the reflected light $R_A$. Because the distance between the position $L_A$ and the position $L_C$ is longer than the distance between the position $L_A$ and the position $L_B$, the reflected light $R_C'$ is attenuated more than the reflected light $R_B'$, and as such, the intensity of the reflected light $R_C'$ is lower than the intensity of the reflected light $R_B'$. In other words, the reflected light $R_A$, $R_B'$, and $R_C'$, which are in the relationship $R_A > R_B' > R_C'$, are all incident on the pixel of interest $P_A$. In reality, the sum of reflected light from a range of N rows and M columns of neighboring pixels extending in the main scanning direction and the sub scanning direction from the pixel of interest $P_A$ at the center is incident on the pixel of interest $P_A$ as flare, not just the two neighboring pixels $P_B$ and $P_C$.

Assuming the position of the pixel of interest $P_A$ is (n,m) and the position of the neighboring pixel is (i,j), and i=n−7, . . . , n+7 and j=m−11, . . . , m+11, an example of the ratio of a flare component from each position of the neighboring pixels to a desired component incident on the pixel of interest $P_A$ is indicated in FIG. 7 in matrix format. According to the example in FIG. 7, the magnitude of the flare component from a neighboring pixel 11 pixels away in the main scanning direction and seven pixels away in the sub scanning direction is substantially zero even if the sheet is white (i.e., when the effect of flare is the greatest). In other words, in the example illustrated in FIG. 7, the range of neighboring pixels that affect the reading pixel values of a single pixel of interest is 13 pixels by 21 pixels in a two-dimensional pixel array. In the present specification, this range of influence may be referred to as a "flare range". The size of the flare range (and the degree of influence per pixel therein) depends primarily on the structural properties of the scanner (e.g., the intensity of irradiated light, the image sensor configuration, the glass thickness, and the like), and is known through testing during the product development phase.

In the example illustrated in FIG. 7, the size of the flare range in the sub scanning direction is smaller than the size of the flare range in the main scanning direction because the scanner reads the image on the sheet by irradiating the sheet while the sheet is being transported in the transport direction (i.e., the sub scanning direction). A pattern for calibration (described later) is designed taking into account the size and shape of the flare range, which is related to the characteristics of the scanner (e.g., the first reading unit 505a and the second reading unit 505b).

Figure 8:
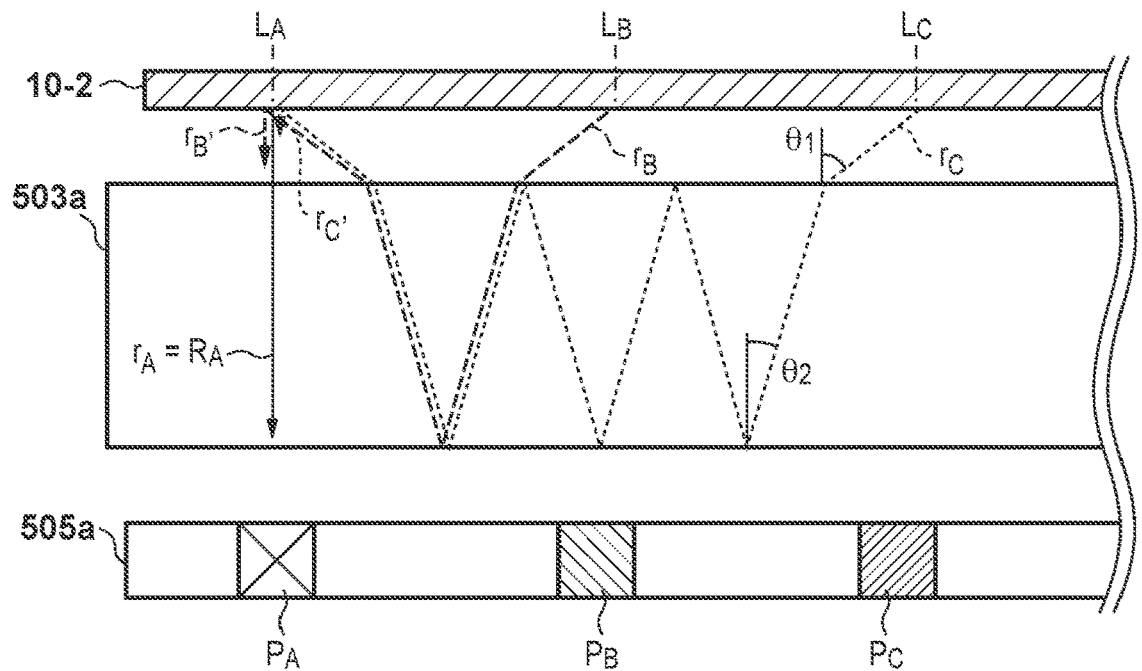
FIG. 8 is a descriptive diagram illustrating flare from neighboring pixels with respect to a pixel of interest when a sheet is solid black.

FIG. 8 schematically illustrates the state of flare for a sheet 10-2 on which a solid black image is formed at all positions aside from the position $L_A$ of the pixel of interest $P_A$, which is white, assuming the same positional relationships among pixels as in FIG. 6A. When the first reading unit 505a irradiates the sheet 10-2 with light, the light is reflected by the lower surface of the sheet 10-2. Reflected light r A is the main component of light reflected at the position $L_A$, and is incident on the pixel of interest $P_A$. Because the position $L_A$ on the sheet 10-2 is white, $r_A = R_A$. Reflected light r B is a secondary component of the light reflected at the position $L_B$, which is attenuated by being refracted and reflected at a boundary surface of the flowing reading glass 503a, and is incident on the pixel of interest $P_A$ as reflected light $r_B'$. Reflected light $r_C$ is a secondary component of the light reflected at the position $L_C$, which is attenuated by being refracted and reflected at the boundary surface of the flowing reading glass 503a, and is incident on the pixel of interest $P_A$ as reflected light $r_C'$. The sheet 10-2 is black at the positions $L_B$ and $L_C$ (i.e., the effect of flare is the smallest), and thus the intensities of the reflected light $r_B'$ and $r_C'$ are small enough to be substantially negligible. In this case, the incident light on the pixel of interest $P_A$ is effectively only the reflected light $r_A$, which is the desired component. Based on this, a ratio Z of the total amount of flare from the neighboring pixels to the desired component of the read signal value of the pixel of interest in the case of the white sheet 10-1 can be expressed by the following Formula (2):

$$Z = ((R_A + R_B' \times R_C') - r_A)/R_A = (R_B' + R_C')/R_A \quad (2)$$

For example, when $R_B' \times R_C' = 10$ and $R_A = 250$, Z=0.040.

4-3. Calibration of Image Data

When forming an image on a sheet in the inspection system 1, the image quality may drop, e.g., the tint may vary, depending on the properties of the printer. The inspection system 1 provides a calibration function for compensating for such drops in image quality.

The calibration is started, for example, in response to the user operating the calibration button 121 in the print settings screen 110 illustrated in FIG. 4. Having detected the calibration button 121 being operated, the CPU 401 of the control apparatus 400 controls the image-forming apparatus 200 to form a reference image for calibration on a sheet based on reference image data. Here, the "reference image" is an image representing a predetermined chart pattern (which may be referred to as "pattern for calibration" or "test chart" hereinafter).

(1) Existing Pattern for Calibration

Figure 9A:
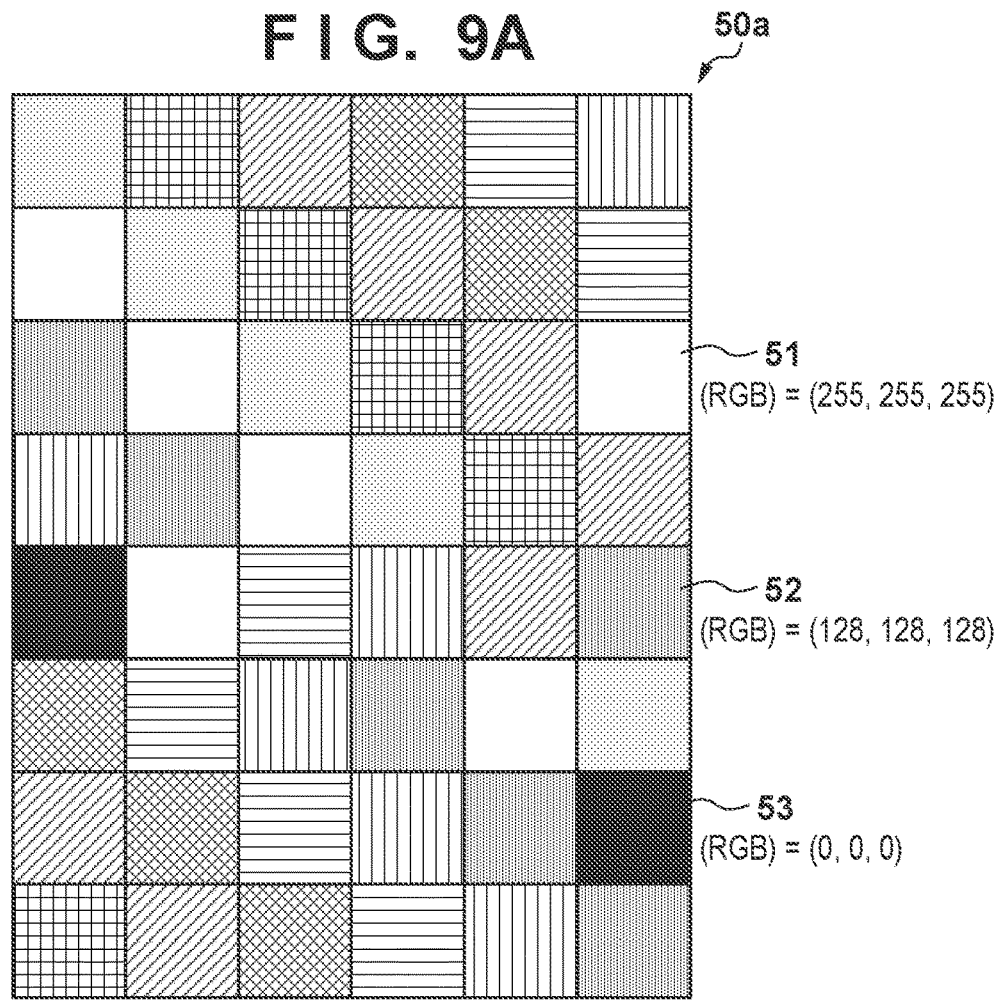
FIG. 9A is a descriptive diagram illustrating an example of the configuration of an existing pattern for calibration.

FIG. 9A is a diagram illustrating an example of the configuration of an existing pattern for calibration. In the example in FIG. 9A, a pattern for calibration 50a includes a patch arrangement constituted by six patches (small regions) in the main scanning direction and eight patches in the sub scanning direction, for a total of 48 patches. A single patch has a uniform color internally, and different patches have different colors (colors which differ in terms of luminance, hue, and/or saturation). For example, the RGB values of a patch 51 are (255,255,255), the RGB values of a patch 52 are (128,128,128), and the RGB values of a patch 53 are (0,0,0).

In general, more accurate calibration is possible with a greater number of patches in the pattern for calibration and a greater number of colors. However, due to sheet size constraints, there is a tradeoff between the number of patches and the size (e.g., area) of the individual patches, and increasing the number of patches means that the size allocated to the individual patches is reduced. If the patch size is too small, the effect of flare from neighboring pixels will be predominant, and the performance of the configuration will rather drop.

Figure 9B:
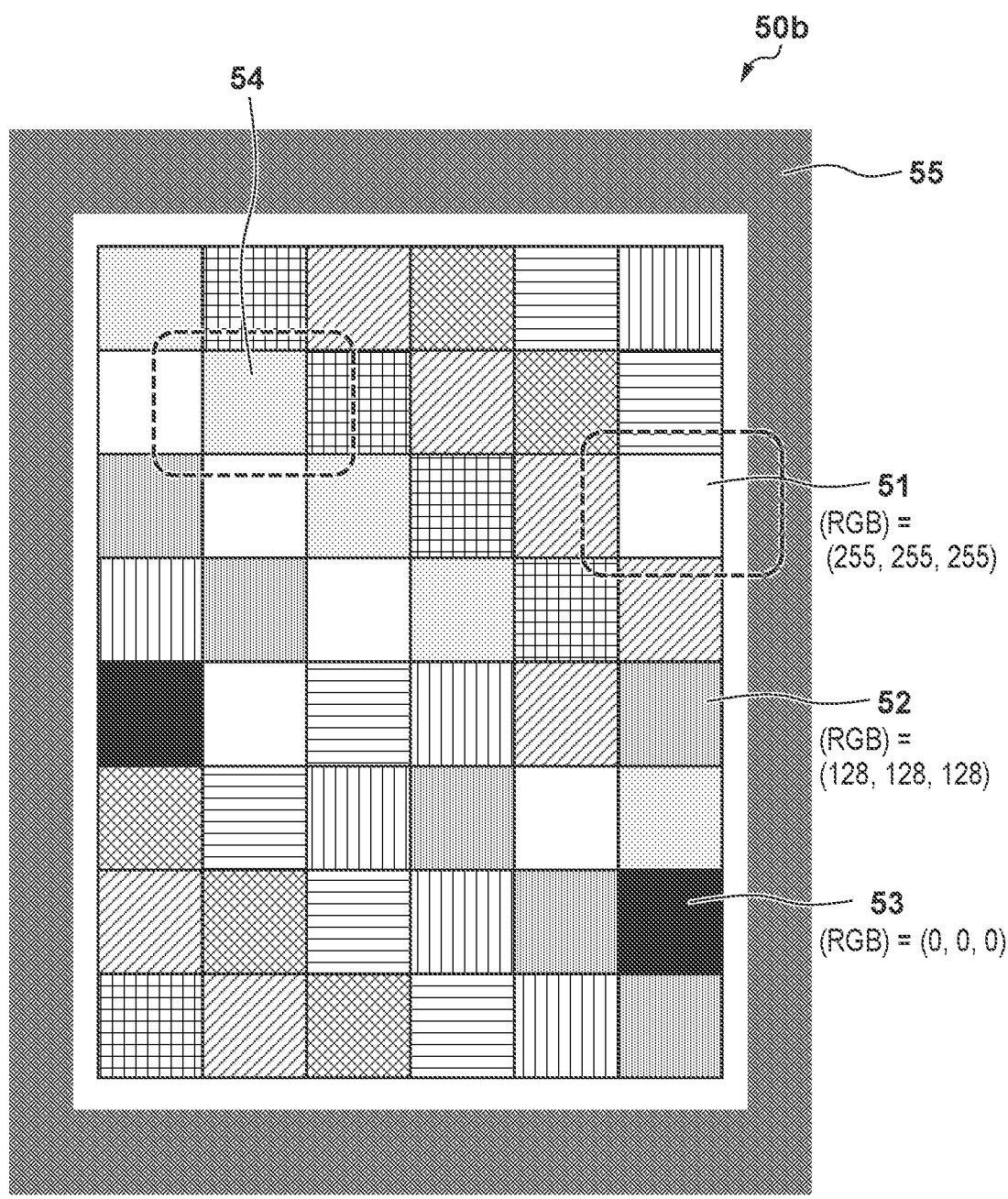
FIG. 9B is a descriptive diagram illustrating another example of the configuration of an existing pattern for calibration.

FIG. 9B is a diagram illustrating another example of the configuration of an existing pattern for calibration. In addition to a patch arrangement that is the same as the pattern for calibration 50a, a pattern for calibration 50b illustrated in FIG. 9B further includes a low brightness region 55 surrounding the patch arrangement. As proposed in Japanese Patent Laid-Open No. 2010-085744, surrounding the patch arrangement in the pattern for calibration 50b with the low brightness region 55 makes it possible to reduce the influence of flare from the base color of the sheet on the result of reading the patch image.

However, the existing patterns for calibration described above have room for improvement with respect to the arrangement of the patches. For example, the effect of reducing the influence of flare provided by the low brightness region 55 differs depending on the positional relationship between each patch and the low brightness region 55. In particular, a patch located at the periphery of the patch arrangement (called a "periphery patch" hereinafter) experiences the effect of reducing the influence of flare more strongly because the low brightness region 55 is located very close by. On the other hand, a patch located further inward in the patch arrangement than periphery patches (called an "interior patch" hereinafter) does not have a low brightness region 55 nearby, but is instead surrounded by other patches, and therefore does not experience much of the effect of reducing the influence of flare. In FIG. 9B, the flare range centered on the center of a periphery patch 51 and the flare range centered on the center of an interior patch 54 are indicated by broken lines. For example, the size of each patch is 15 mm high×15 mm wide, and the size of the flare range is 25 mm high×35 mm wide. Because a percentage of the flare range around a periphery patch 53 belongs to the low brightness region 55, the periphery patch 53 is less susceptible to the influence of flare. On the other hand, the flare range around the interior patch 54 does not include a part belonging to the low brightness region 55, and instead, a part thereof belongs to a high-brightness adjacent patch. The interior patch 54 is therefore susceptible to the influence of flare.

(2) Improving Pattern for Calibration

Figure 10A:
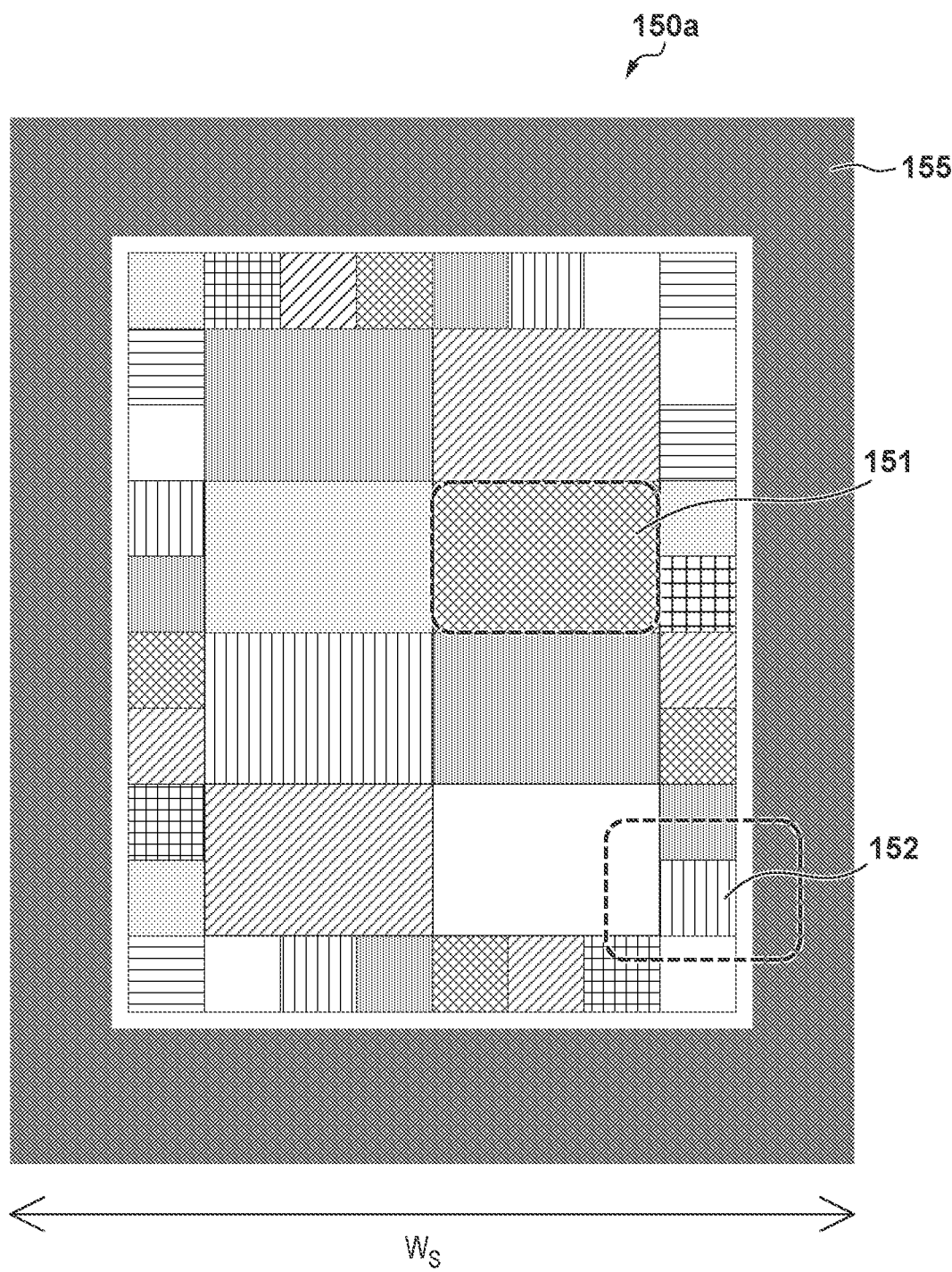
FIG. 10A is a descriptive diagram illustrating a first example of an improved pattern for calibration.

FIG. 10A illustrates a first example of an improved pattern for calibration. In the first example, a pattern for calibration 150a includes a patch arrangement constituted by eight interior patches 151 and 32 periphery patches 152, and a low brightness region 155 disposed so as to completely surround the patch arrangement. The low brightness region 155 may be a black region, for example, in order to reduce reflected light to the maximum extent. Each of the interior patches 151 and the periphery patches 152 has a uniform color internally, and different patches have different colors (although some patches may have the same color). The periphery patches 152 are smaller in size than the interior patches 151. The periphery patches 152 in FIG. 10A are smaller in size than the periphery patches 51, 52, and 53 in the pattern for calibration 50b in FIG. 9B. However, because a given percentage of the flare range (indicated by the broken lines) around a periphery patch 152 belongs to the low brightness region 155, the influence of flare on the periphery patch 152 is reduced to a sufficient extent. The interior patches 151 in FIG. 10A are larger in size than the interior patch 54 in the pattern for calibration 50b illustrated in FIG. 9B. Here, the size of the interior patches 151 is at least the size of the flare range related to the characteristics of the first reading unit 505a and the second reading unit 505b (in both the main scanning direction and the sub scanning direction).

By setting the size of the interior patch to be at least the size of the flare range unique to the apparatus as in the example illustrated in FIG. 10A, at least reflected light from adjacent patches will not substantially reach the center of the interior patch. This makes it possible to eliminate an error component in reading the patch image of the interior patch. Additionally, reducing the size of the periphery patch while reducing the influence of flare by using a low brightness region makes it possible to ensure sufficient diversity of the colors included in the patch arrangement and maintain high calibration performance.

Figure 10B:
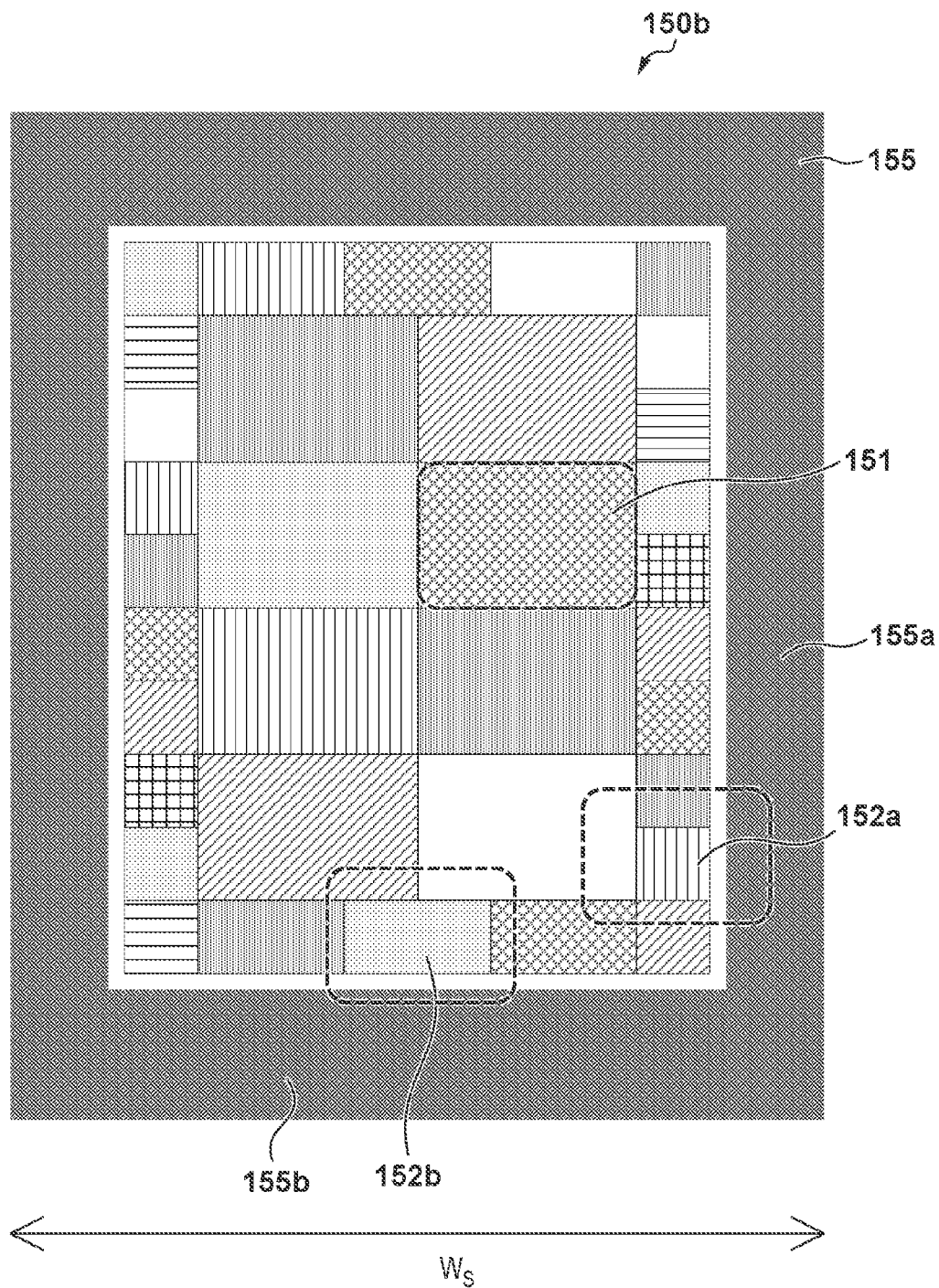
FIG. 10B is a descriptive diagram illustrating a second example of an improved pattern for calibration.

FIG. 10B illustrates a second example of an improved pattern for calibration. In the second example, a pattern for calibration 150b includes a patch arrangement constituted by eight interior patches 151 and 26 periphery patches, and a low brightness region 155 disposed so as to completely surround the patch arrangement. The low brightness region 155 includes a first partial region 155a following a long side of the patch arrangement parallel to the transport direction of the sheets, and a second partial region 155b following a short side of the patch arrangement perpendicular to the transport direction. In the second example too, the size of the interior patches 151 is at least the size of the flare range related to the characteristics of the first reading unit 505a and the second reading unit 505b. The interior patches 151 are also greater in size than the periphery patches.

However, unlike the first example, in the second example, the periphery patches are not uniform in size. Specifically, the pattern for calibration 150b includes 20 first periphery patches 152a located on the long side of the patch arrangement and six second periphery patches 152b located on the short side of the patch arrangement. The first periphery patches 152a are smaller in size than the second periphery patches 152b. The pattern for calibration 150b is designed, for example, such that the sizes of the interior patches 151, the first periphery patches 152a, and the second periphery patches 152b satisfy the following Conditional Expression (1):

$$(S-S_P) \times \alpha_{TH} \leq S_B \quad \text{Conditional Expression (1)}$$

$(S-S_P)$ on the left side of Conditional Expression (1) represents a difference obtained by subtracting a patch size $S_P$ from a size S of the flare range, i.e., the size of a non-patch region within the flare range centered on the center of the patch (note that, if the difference is less than zero, the size of the non-patch region is taken as zero). $S_B$ on the right side represents the size of a part, within the flare range centered on the center of the patch, that belongs to the low brightness region. $\alpha_{TH}$ is a predetermined coefficient threshold, and may be, for example, $\alpha_{TH}=0.25$. Accordingly, Conditional Expression (1) expresses a condition that the proportion of the size of the part within the flare range that belongs to the low brightness region, relative to the size of the non-patch region within the flare range centered on the center of the patch, does not fall below a predetermined threshold.

For example, focusing on the interior patches 151 of the patch arrangement in the pattern for calibration 150b, the size of the interior patches 151 is at least the size of the flare range, and thus the size of the non-patch region is zero $(S-S_P=0)$, which satisfies Conditional Expression (1). Focusing on the first periphery patches 152a, the size of the first periphery patches 152a is small, and thus the size of the non-patch region increases. However, because the low brightness part that falls within the flare range surrounded by the broken line is also sufficiently large, Conditional Expression (1) is still satisfied. Focusing on the second periphery patches 152b, the size of the second periphery patches 152b is expanded compared to the first periphery patches 152a, and thus the size of the non-patch region becomes smaller. Accordingly, the low brightness part that falls within the flare range is smaller than in the case of the first periphery patches 152a, but Conditional Expression (1) is nonetheless satisfied. In this manner, Conditional Expression (1) is satisfied for all patches included in the patch arrangement, and thus the influence of flare from neighboring pixels is no longer predominant in the reading of any patch image, which makes it possible to significantly improve the calibration performance throughout the entire color space.

Assume, as a specific example, that $\alpha_{TH}=0.25$ when the size of the flare range is 25 mm high×35 mm wide. In this case, Conditional Expression (1) can be satisfied for all patches if the size of the interior patches 151 is set to 25 mm high×35 mm wide, the size of the first periphery patches 152a to 10 mm high×10 mm wide, and the size of the second periphery patches 152b to 10 mm high×35 mm wide.

Figure 11A:
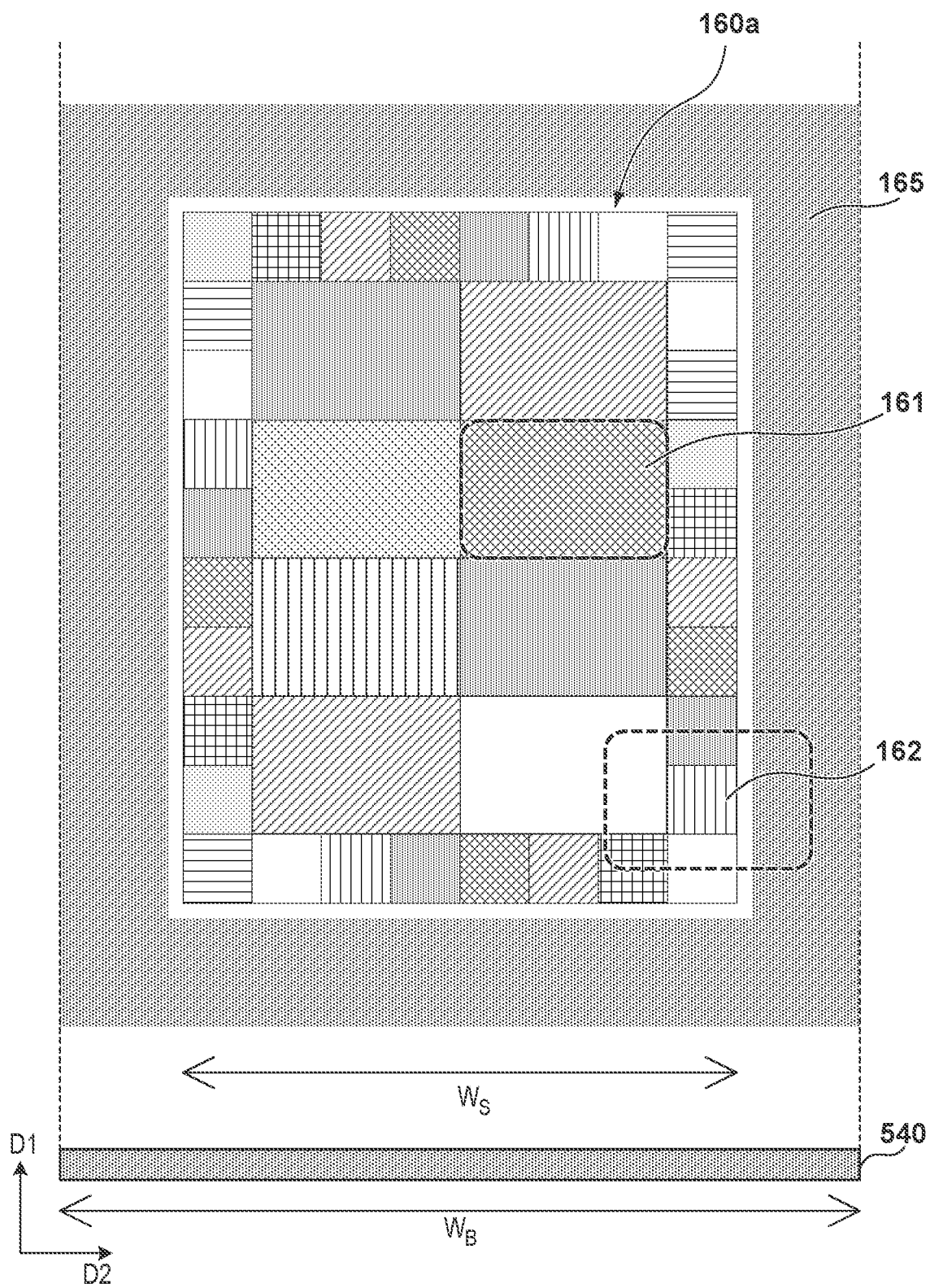
FIG. 11A is a descriptive diagram illustrating a third example of an improved pattern for calibration.

FIG. 11A illustrates a third example of an improved pattern for calibration. In the third example, a pattern for calibration 160a includes a patch arrangement constituted by eight interior patches 161 and 32 periphery patches 162, but does not include a low brightness region surrounding the patch arrangement. Instead, the surfaces of the backings 540a and 540b described with reference to FIG. 1A (collectively called "backings 540" hereinafter), which face the transport path 501, are assumed to have dark colors. Here, "dark color" means that the reading luminance values (R, G, and B) of the three color components when the reflected light from the surface is read fall within a range of, for example, (0,0,0) to (50,50,50). Note that (0,0,0) indicates black. A width W B of the backings 540 along a main scanning direction D2 that is perpendicular to a sheet transport direction D1 is wider than a width $W_S$ of the sheet on which the pattern for calibration 160*a* is formed. Additionally, the pattern for calibration 160*a* is read throughout a reading period including a period in which the sheet passes the reading position (the reading period being slightly longer than the period of passage). As a result, a reference read image read by the inspection apparatus 500 includes, in addition to a patch arrangement region corresponding to the patch arrangement, a low brightness background region 165 that is based on the reading of the backings 540 and that surrounds the patch arrangement region. As in the first example, each of the interior patches 161 and the periphery patches 162 has a uniform color internally, and different patches have different colors. The periphery patches 162 are smaller in size than the interior patches 161. The periphery patches 162 in FIG. 11A are smaller in size than the periphery patches 51, 52, and 53 in the pattern for calibration 50*b* in FIG. 9B. However, because a given percentage of the flare range (indicated by the broken lines) around the periphery patches 162 belongs to the background region 165, the influence of flare on the periphery patches 162 is reduced to a sufficient extent. The interior patches 161 in FIG. 11A are larger in size than the interior patch 54 in the pattern for calibration 50*b* illustrated in FIG. 9B. Here, the size of the interior patches 161 is at least the size of the flare range related to the characteristics of the first reading unit 505*a* and the second reading unit 505*b*, as is the case with the interior patches 151 in the first example.

Figure 11B:
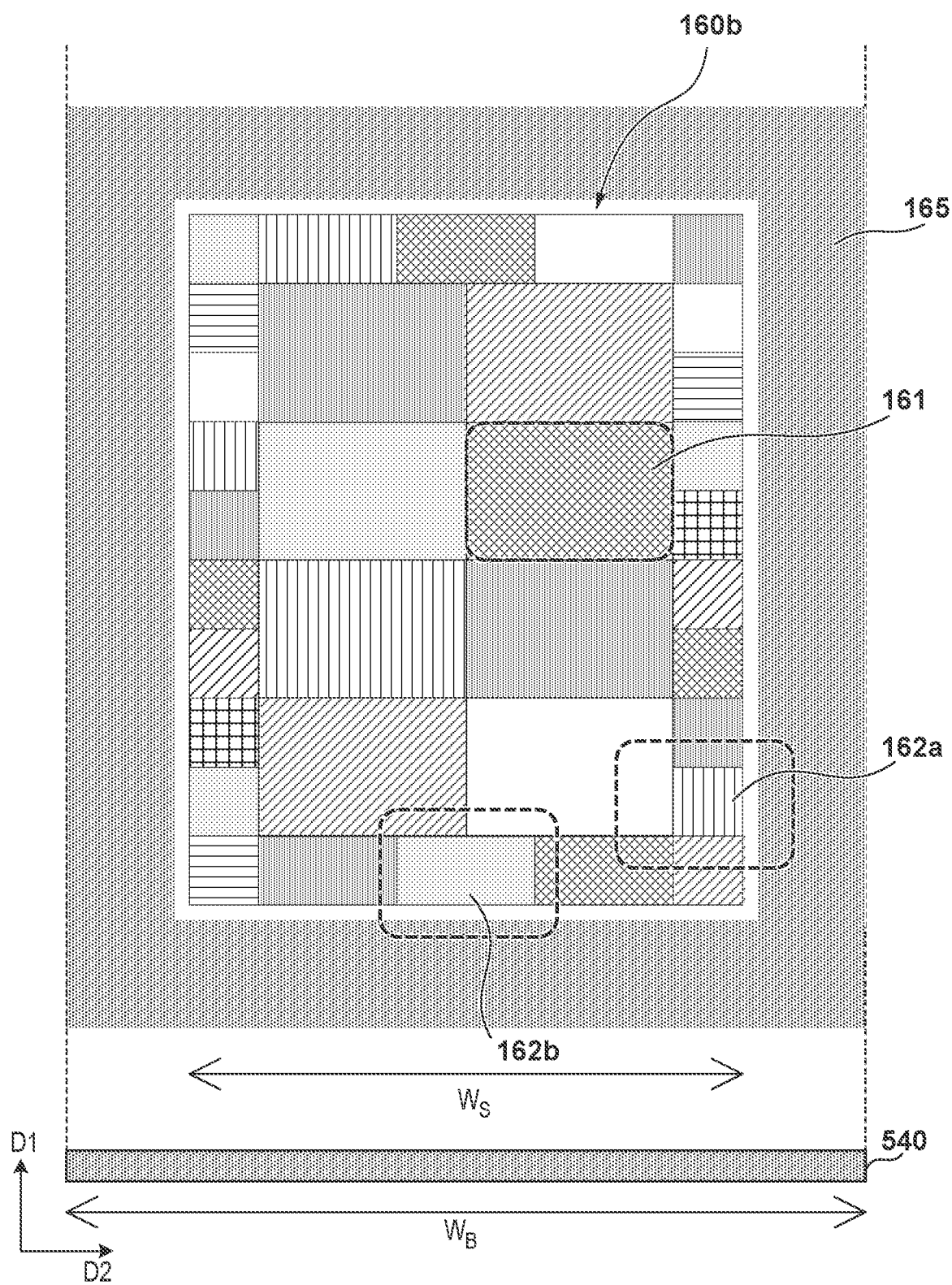
FIG. 11B is a descriptive diagram illustrating a fourth example of an improved pattern for calibration.

FIG. 11B illustrates a fourth example of an improved pattern for calibration. In the fourth example, a pattern for calibration 160*b* includes a patch arrangement constituted by eight interior patches 161 and 26 periphery patches, but as in the third example, does not include a low brightness region surrounding the patch arrangement. Instead, the aforementioned backings 540 having a dark color are used in the fourth example as well. As a result, the reference read image read by the inspection apparatus 500 includes, in addition to the patch arrangement region corresponding to the patch arrangement, the background region 165 that is based on the reading of the backings 540 and that surrounds the patch arrangement region. The size of the interior patches 161 of the pattern for calibration 160*b* is at least the size of the flare range related to the characteristics of the first reading unit 505*a* and the second reading unit 505*b*. The patch sizes of the interior patches 161, first periphery patches 162*a*, and second periphery patches 162*b* of the pattern for calibration 160*b* satisfy the patch size conditions described with reference to the second example. The interior patches 161 are also greater in size than the periphery patches. The size of the first periphery patches 162*a* located on a first side of the patch arrangement parallel to the sheet transport direction D1 is smaller than the size of the second periphery patches 162*b* located on a second side of the patch arrangement perpendicular to the transport direction D1.

As in the third and fourth examples, having the reference read image include a background region based on a reading of a backing member having a dark color, without including a low brightness region in the pattern for calibration, makes it possible to effectively reduce the influence of flare while suppressing the amount of toner that needs to be consumed for calibration. Additionally, because patches can be arranged in parts that would be occupied by the low brightness region in the first and second examples, it is also possible to expand individual patch sizes or arrange patches having a greater variety of colors in the pattern for calibration.

The configuration of the pattern for calibration is not limited to the examples illustrated in FIGS. 10A to 11B. For example, in the pattern for calibration, a blank region may or may not be present between the patch arrangement region and the low brightness region. Additionally, the low brightness region may at least partially surround the patch arrangement (e.g., may have a region that is missing, such as a slit, in a part thereof). The number of patches constituting the patch arrangement may be greater or less than the examples illustrated, depending on the target calibration performance. Furthermore, the pattern for calibration may include a marker (a reference mark, for example) for detecting the position where the pattern is formed on the sheet when reading the reference image. Instead, the low brightness region may be used as a marker for position detection.

(3) Tint Calibration

A sheet on which the reference image representing the improved pattern for calibration described above is formed is passed from the image-forming apparatus 200 to the inspection apparatus 500. The first reading unit 505*a* (and, if necessary, the second reading unit 505*b*) of the inspection apparatus 500 reads the reference image formed on the sheet and generates reference read image data. The CPU 511 of the inspection apparatus 500 outputs the reference read image data to the control apparatus 400 via the host OF 515. The calibration unit 412 of the control apparatus 400 derives calibration parameters based on a comparison between the reference image data and the reference read image data, and stores the derived calibration parameters in the storage 430. Then, when the image-forming apparatus 200 forms an image based on new input image data, the calibration unit 412 calibrates the input image data using the calibration parameters stored in the storage 430.

The calibration parameters can be derived, for example, in the form of a lookup table which associates three-dimensional pixel values of the input image data (RIP signal values after expansion into the bitmap format) with post-calibration values in a nonlinear manner. FIG. 12 illustrates an example of the configuration of such a three-dimensional lookup table (LUT). In the example in FIG. 12, an LUT 40 contains records in which pre-calibration RGB values and post-calibration RGB values are associated with each other for each of Ser. No. 16/777,216 candidates for RIP signal values (256×256×256=16,777,216). The combinations of pre-calibration RGB values (RIP signal values) on the left side of the drawing are the key items for lookup. On the other hand, the post-calibration RGB values (calibrated values) on the right side of the drawing are determined in a variable manner based on the aforementioned comparison between the reference image data and the reference read image data. For example, the calibrated values in a record having a key which matches the RGB values defined in any one of the patches can be determined directly from the read signal values of that patch. The calibrated values in other records can be determined through linear or nonlinear interpolation based on the read signal values of at least two patches. In the example in FIG. 12, RIP signal values of (255,255,255) are converted to calibrated values of (250,250,250) as a result of the calibration. Likewise, RIP signal values of (128,128, 128) are converted to calibrated values of (126,126,126), and RIP signal values of (0,0,0) are converted to calibrated values of (8,8,8).

Although an example in which the calibration unit 412 of the control apparatus 400 derives the calibration parameters based on a comparison of the reference image data with the reference read image data has been described here, the calibration parameters may instead be derived by the inspection apparatus 500 (e.g., the comparison unit 518). In this case, the calibration parameters derived by the inspection apparatus 500 can be output to the control apparatus 400 and then used for calibration when executing a print job.

(4) Calibration of Image Forming Position

The calibration unit 412 may detect the position where the reference image is formed on the sheet using the reference read image data, and calibrate the image forming position based on the detected position. For example, in the reference read image of the pattern for calibration 160a described above, an inner edge of the background region 165 corresponds to the edge of the sheet on which the pattern for calibration 160a is formed. Accordingly, by measuring the relative position of the patch arrangement region relative to the edge in the reference read image, the calibration unit 412 can determine how far the image forming position is shifted from a correct position defined in advance. The calibration unit 412 derives calibration parameters indicating an offset amount of the image forming position in order to cancel out the determined shift, and stores the derived calibration parameters in the storage 430. Then, when the image-forming apparatus 200 forms an image based on new input image data, the calibration unit 412 offsets the image forming position using the calibration parameters stored in the storage 430. The calibration unit 412 may similarly calibrate the tilt and the magnification of the image forming region using the reference read image data.

5. Example of Flow of Processing

Figure 13:
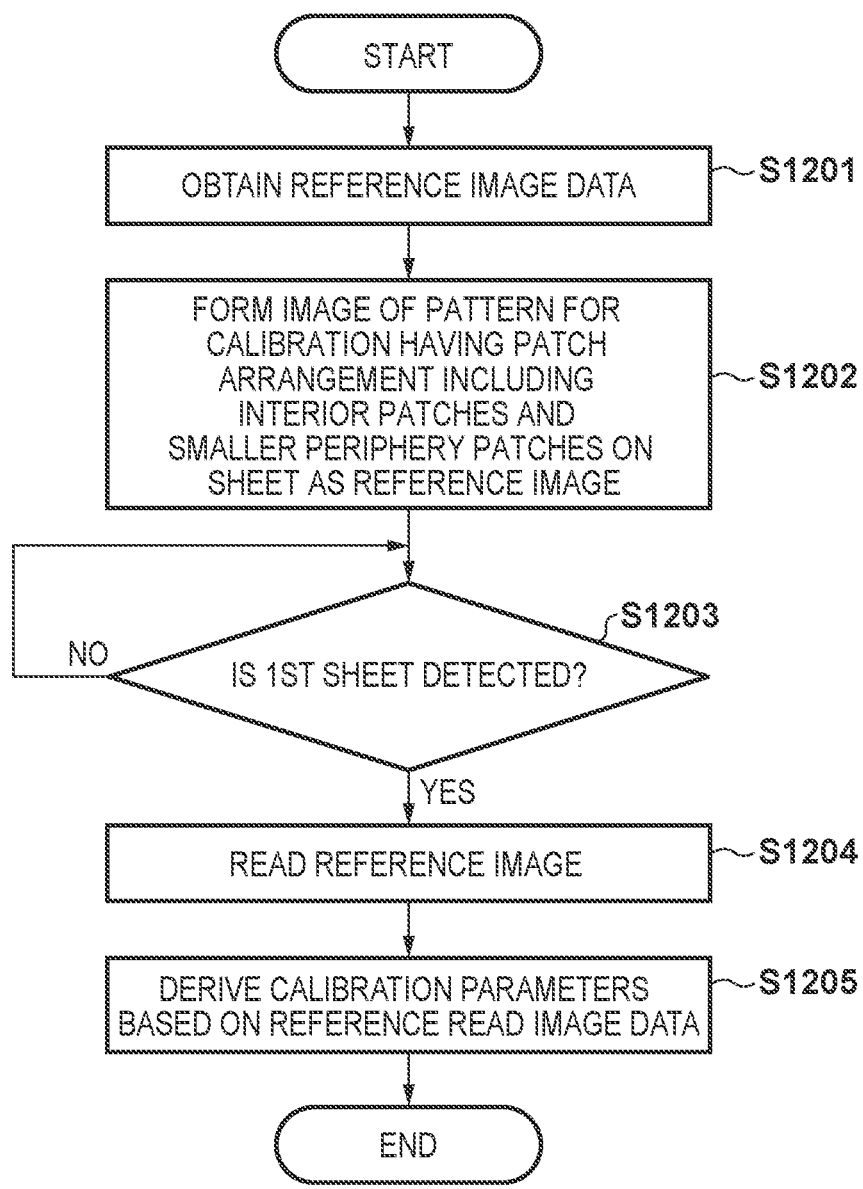
FIG. 13 is a flowchart illustrating an example of the flow of calibration processing according to an embodiment.
Figure 14:
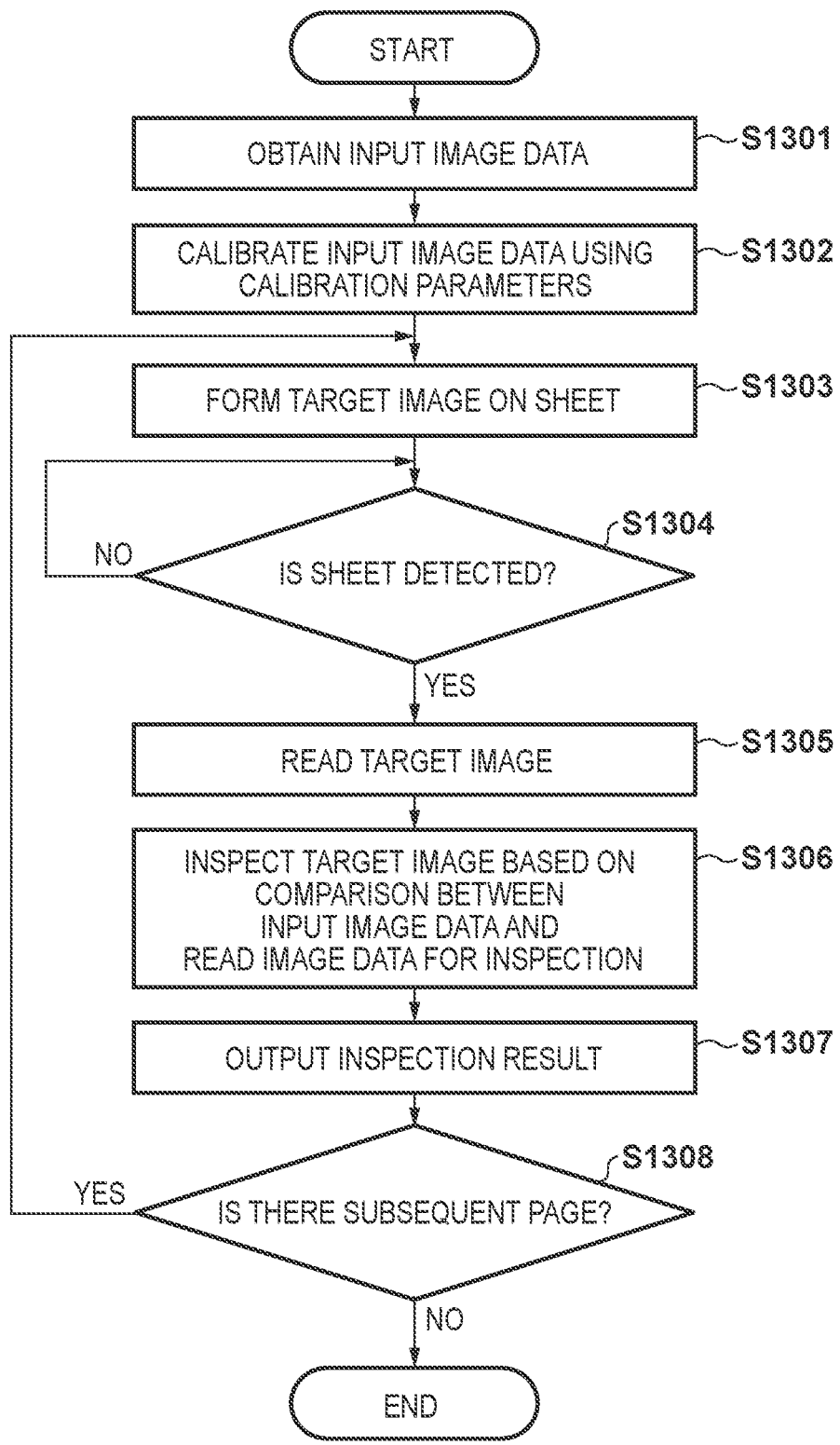
FIG. 14 is a flowchart illustrating an example of the flow of inspection processing according to an embodiment.

This section will describe an example of the flow of the main processing which can be performed in the inspection system 1 according to the foregoing embodiments, with reference to the flowcharts in FIGS. 13 and 14. Note that in the following descriptions, the processing steps are indicated by an S, indicating "step".

(1) Calibration Processing

FIG. 13 is a flowchart illustrating an example of the flow of the calibration processing performed cooperatively by the image-forming apparatus 200, the control apparatus 400, and the inspection apparatus 500.

First, when the user operates the calibration button 121 in the print settings screen 110, in step S1201, the CPU 401 of the control apparatus 400 obtains, from the storage 430, the reference image data for the pattern for calibration designed to satisfy the conditional expression described above. Next, in step S1202, the image-forming apparatus 200 forms the reference image on a first sheet based on the reference image data input from the control apparatus 400. It is assumed here that the reference image is formed only on the first surface of the first sheet. The pattern for calibration represented by the reference image includes at least a patch arrangement constituted by interior patches and smaller periphery patches. In step S1203, the CPU 511 of the inspection apparatus 500 stands by for the first sheet on which the reference image is formed. The sequence moves to step S1204 when, for example, a sensor disposed in the transport path 501 detects the first sheet. In step S1204, the first reading unit 505a of the inspection apparatus 500 optically reads the reference image formed on the first sheet and generates the reference read image data. At this time, the reference read image data is data representing an image including a patch arrangement region and a low brightness region surrounding the patch arrangement region. When the above-described first or second example of the pattern for calibration is employed, the low brightness region is derived from the low brightness region in the reference image formed on the first sheet in step S1202. When the above-described third or fourth example of the pattern for calibration is employed, the low brightness region is based on a reading of the backing 540 by the first reading unit 505a. The generated reference read image data is output from the inspection apparatus 500 to the control apparatus 400. Next, in step S1205, based on the reference read image data input from the inspection apparatus 500, the calibration unit 412 of the control apparatus 400 derives the calibration parameters to be used to calibrate subsequent input image data. The calibration unit 412 stores the derived calibration parameters in the storage 430. Note that in step S1205, the calibration unit 412 may skip the deriving of the calibration parameters if the reference read image data indicates an anomalous value (e.g., a value in which a difference from the pixel value corresponding to the pattern for calibration exceeds an anomaly detection threshold). In this case, the existing calibration parameters stored in the storage 430 need not be updated. Additionally, default calibration parameters may be stored in the storage 430.

(2) Inspection Processing

FIG. 14 is a flowchart illustrating an example of the flow of the inspection processing performed cooperatively by the image-forming apparatus 200, the control apparatus 400, and the inspection apparatus 500.

First, when the user operates the print start button 149 in the inspection print screen 140, in step S1301, the CPU 401 of the control apparatus 400 obtains the input image data designated in the print job. The input image data obtained here is RIP data after rasterization performed by the RIP 413. Next, in step S1302, the calibration unit 412 reads out the calibration parameters from the storage 430 and calibrates the input image data using the read-out calibration parameters. Next, in step S1303, the image-forming apparatus 200 forms the target image on a second sheet based on the post-calibration input image data input from the control apparatus 400. It is assumed here that the target image is formed only on the first surface of the second sheet. The post-calibration input image data is output from the control apparatus 400 to the inspection apparatus 500. In step S1304, the CPU 511 of the inspection apparatus 500 stands by for the second sheet on which the target image is formed. The sequence moves to step S1305 when, for example, a sensor disposed in the transport path 501 detects the second sheet. In step S1305, the first reading unit 505a of the inspection apparatus 500 optically reads the target image formed on the second sheet and generates the read image data for inspection. Then, in step S1306, the inspection unit 530 inspects the target image formed on the second sheet based on a comparison of the post-calibration input image data with the read image data for inspection generated in step S1305. For example, the inspection unit 530 may inspect the tint of the target image by comparing the RIP data (rasterized and calibrated input image data) serving as a reference for the inspection with the read image data for inspection on a color component-by-color component basis. Specifically, the inspection unit 530 may determine that the target image is defective when the number of pixels for which a difference in the pixel values between the two instances of image data exceeds a defect detection threshold is at least K pixels (where K is an integer) for at least one of the color components R, G, and B. This determination may be performed only for pixels belonging to the inspection area registered through the inspection print screen 140, or only for pixels not belonging to the non-inspection area registered through the inspection print screen 140. Next, in step S1307, the inspection unit 530 outputs the inspection result to the control apparatus 400. The CPU 401 of the control apparatus 400 notifies the user, via the operation unit 100, of the inspection result input from the inspection apparatus 500. The CPU 401 may display, in the display, information indicating whether the target image is good or defective. The CPU 401 may also light the lamp or output a warning sound from the speaker when the target image is determined to be defective. The CPU 401 may further control the stacker 600 such that a sheet on which a defective image is printed is discharged to the purge tray 620. Next, in step S1308, the CPU 401 determines whether there is a subsequent page to be printed in the inspection printing job. If there is a subsequent page to be printed, the sequence returns to step S1303, where the target image for the subsequent page is formed on another sheet based on the post-calibration input image data. If there is no subsequent page, the inspection processing illustrated in FIG. 14 ends.

6. Conclusion

Thus far, embodiments of the technique according to the present disclosure have been described with reference to FIGS. 1 to 14. According to the above-described embodiments, in an image-forming apparatus, a reference image representing an improved pattern for calibration is formed on a first sheet, and calibration parameters are derived based on reference read image data generated by optically reading the reference image. Then, input image data is calibrated using the derived calibration parameters, and a printed image is formed on a second sheet based on the calibrated input image data. The pattern for calibration includes a patch arrangement constituted by a plurality of patches, and the size of a periphery patch located at the periphery of the patch arrangement is smaller than the size of an interior patch located further on an inner side than the periphery patch. Additionally, the image represented by the reference read image data includes a region of low brightness at least partially surrounding the patch arrangement region. Making the size of the periphery patch, which is relatively close to the low brightness region, smaller than the interior patch makes it possible to effectively reduce the influence of flare when reading the reference image while ensuring sufficient color diversity for the patches in the patch arrangement of the pattern for calibration. The performance of calibration using the calibration parameters derived based on the reference read image data is improved as a result.

Additionally, in the above-described embodiments, the reference image is read throughout a reading period that includes a period in which the first sheet is being transported in a transport direction. The low brightness region includes a first partial region following a first side of the patch arrangement that is parallel to the transport direction, and a second partial region following a second side of the patch arrangement that is perpendicular to the transport direction. In one example, the size of a first periphery patch located on the first side of the patch arrangement is smaller than the size of a second periphery patch located on the second side of the patch arrangement. Generally, the range of influence of flare tends to be greater in the direction perpendicular to the transport direction (the main scanning direction of the scanner) than in the transport direction of the sheet (the sub scanning direction of the scanner). Accordingly, a more efficient arrangement of the patches can be achieved by varying the patch sizes depending on which side of the patch arrangement each periphery patch is located.

In one example, the pattern for calibration is designed so that, for any patch, the ratio of the size of the low brightness region within the flare range to the size of a non-patch region within the flare range centered on the center of the patch does not fall below a predetermined threshold. By using a pattern for calibration designed in this manner, there are no patches for which the influence of flare from neighboring pixels is predominant, which makes it possible to significantly improve the calibration performance throughout the color space.

Additionally, in the above-described embodiments, an inspection apparatus including a reading unit that optically reads a printed image formed on the second sheet and generates read image data for inspection may be disposed in a stage following the above-described image-forming apparatus. The inspection apparatus then inspects the printed image formed on the second sheet based on a comparison between the input image data and the read image data for inspection. Utilizing data calibrated using the calibration parameters based on the improved pattern for calibration in this manner to inspect the printed image makes it possible to increase the accuracy of the inspection as well.

7. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priorities from Japanese Patent Application No. 2022-095222, filed on Jun. 13, 2022 and Japanese Patent Application No. 2023-046969, filed on Mar. 23, 2023 which are hereby incorporated by references herein in their entireties.

What is claimed is:

1. An image-forming system comprising:
an image-forming apparatus configured to form an image on a sheet;
a reading apparatus configured to read, via a transparent member, an image formed on a sheet conveyed from the image-forming apparatus to obtain read image data; and
at least one processor configured to:
(1) control the image-forming apparatus to form a test chart that is a predetermined image on a first sheet,
(2) calibrate, using first read image data obtained by the reading apparatus reading the test chart on the first sheet, second read image data that is obtained by the reading apparatus reading an inspection target image formed by the image-forming apparatus on a second sheet based on RIP data, and
(3) inspect the inspection target image based on the calibrated second read image data and the RIP data,
wherein the test chart includes (a) a patch arrangement with a plurality of patches and (b) a low brightness region that at least partially surrounds the patch arrangement, and
wherein a size of a periphery patch located at a periphery of the patch arrangement is smaller than a size of an interior patch located further inside than the periphery patch.

2. The image-forming system according to claim 1, wherein the reading apparatus includes a backing member of a black color disposed at a reading position opposite to the transparent member with respect to a conveyance path along which each sheet is conveyed, the reading position being a position at which the reading apparatus reads an image on a sheet.

3. The image-forming system according to claim 2, wherein a width of the backing member in a width direction perpendicular to the conveyance path is greater than a width of the first sheet in the width direction.

4. The image-forming system according to claim 1, wherein the low brightness region includes (1) a first partial region following a first side of the patch arrangement parallel to a conveyance direction of a sheet, and (2) a second partial region following a second side of the patch arrangement perpendicular to the conveyance direction, and
wherein a size of a first periphery patch located on the first side is smaller than a size of the second periphery patch located on the second side.

5. The image-forming system according to claim 1, wherein the at least one processor is configured to:
generate calibration data based on the first read image data,
calibrate the second read image data using the calibration data, and
inspect the inspection target image based on the calibrated second read image data and the RIP data.

6. The image-forming system according to claim 5, wherein the image-forming system has: (1) a first operation mode in which the test chart is formed on a sheet to generate the calibration data; and (2) a second operation mode in which the inspection target image is formed on a sheet and is inspected by the at least one processor, and
wherein the at least one processor is configured to execute the first operation mode or the second operation mode in response to a user input.

7. The image-forming system according to claim 5, wherein the calibration data is generated based on a ratio between the first read image data and RIP data corresponding to the test chart.

8. The image-forming system according to claim 1, wherein the at least one processor is configured to:
control the image-forming apparatus to form a second test chart that is a predetermined image on a third sheet, and
detect an edge position of the third sheet in third read image data obtained by the reading apparatus reading the second test chart on the third sheet, and
wherein the image-forming apparatus is configured to set an image-forming condition for forming an image based on a distance between the detected edge position and an image-forming position of the second test chart in the third read image data.

9. The image-forming system according to claim 1, wherein the image-forming apparatus is configured to form an image based on data for image formation generated from RIP data.

* * * * *